(12) United States Patent
Balaji et al.

(10) Patent No.: US 12,411,558 B2
(45) Date of Patent: Sep. 9, 2025

(54) KEYBOARD ACCESSORY FOR ELECTRONIC DEVICE

(71) Applicant: Apple Inc., Cupertino, CA (US)

(72) Inventors: Santhana K. Balaji, Campbell, CA (US); Jaime G. Chavez Ruiz Garza, San Francisco, CA (US); Blake R. Marshall, San Jose, CA (US); Robert U. Liu, San Jose, CA (US); Chen Zheng, Santa Clara, CA (US); Ramon Villar Ramirez, Cupertino, CA (US); Jonathan M. Beard, San Jose, CA (US); Adam S. Howell, Oakland, CA (US); Taylor H. Gilbert, Los Gatos, CA (US); Alexander L. Jackson, San Francisco, CA (US); Qigen Ji, Fairfield, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/430,375

(22) Filed: Feb. 1, 2024

(65) Prior Publication Data

US 2024/0385697 A1     Nov. 21, 2024

Related U.S. Application Data

(60) Provisional application No. 63/503,382, filed on May 19, 2023.

(51) Int. Cl.
   *G06F 3/023*        (2006.01)
   *G06F 3/02*         (2006.01)
   *G06F 3/042*        (2006.01)

(52) U.S. Cl.
   CPC .......... *G06F 3/0231* (2013.01); *G06F 3/0213* (2013.01); *G06F 3/0426* (2013.01)

(58) Field of Classification Search
   CPC ..... G06F 3/0231; G06F 3/0213; G06F 3/0426
   See application file for complete search history.

(56) References Cited

U.S. PATENT DOCUMENTS

| | | | | |
|---|---|---|---|---|
| 8,498,100 B1 * | 7/2013 | Whitt, III | ............. | H05K 5/0234 |
| | | | | 361/679.28 |
| 8,599,542 B1 * | 12/2013 | Healey | ................. | G06F 1/1626 |
| | | | | 455/575.8 |

(Continued)

FOREIGN PATENT DOCUMENTS

| | | | |
|---|---|---|---|
| JP | 2011227698 A | 11/2011 | |
| JP | 2014235544 A | 12/2014 | |

(Continued)

OTHER PUBLICATIONS

Logitech, Folio Touch, available at: https://www.logitech.com/en-us/products/ipad-keyboards/folio-touch.html,, accessed as early as Nov. 1, 2022.

(Continued)

*Primary Examiner* — Grant Sitta
(74) *Attorney, Agent, or Firm* — Dorsey & Whitney LLP

(57) ABSTRACT

A modular electronic device system that can include a computing device in electronic communication with an input device. Various types of sensor contained in either or both of the computing device and input device are used to determine orientation and hinge angle between the computing device and input device. Input settings can be changed according to the data from the various sensors. The input device can also include an elongated tail that is configured to attach to the computing device. The elongated tail can allow multiple physical configurations for ease of use.

16 Claims, 12 Drawing Sheets

(56) References Cited

U.S. PATENT DOCUMENTS

| | | | |
|---|---|---|---|
| D780,758 S | 3/2017 | Bailey et al. | |
| 9,762,278 B2 | 9/2017 | Griffin et al. | |
| 10,551,878 B2* | 2/2020 | Longo | G06F 1/1683 |
| 10,817,029 B1* | 10/2020 | Files | G06F 1/1686 |
| 10,892,625 B1 | 1/2021 | Franklin et al. | |
| 11,599,178 B2* | 3/2023 | Rivolta | G06F 1/1677 |
| 2009/0303208 A1* | 12/2009 | Case, Jr. | G06F 1/1616 |
| | | | 345/204 |
| 2011/0280641 A1* | 11/2011 | Jiang | G06F 3/0216 |
| | | | 400/486 |
| 2013/0077236 A1* | 3/2013 | Becze | H04N 21/4316 |
| | | | 361/679.56 |
| 2013/0216740 A1* | 8/2013 | Russell-Clarke | B21D 31/04 |
| | | | 219/121.72 |
| 2013/0232353 A1* | 9/2013 | Belesiu | G06F 3/01 |
| | | | 702/56 |
| 2013/0235083 A1* | 9/2013 | Bao | G09G 5/34 |
| | | | 345/660 |
| 2015/0091882 A1* | 4/2015 | Dwarka | G06F 1/3206 |
| | | | 345/184 |
| 2015/0115943 A1* | 4/2015 | Jin | G06F 1/1677 |
| | | | 324/226 |
| 2015/0116362 A1* | 4/2015 | Aurongzeb | G06F 3/1446 |
| | | | 345/650 |
| 2015/0116364 A1* | 4/2015 | Aurongzeb | G06F 1/1649 |
| | | | 345/659 |
| 2015/0278529 A1* | 10/2015 | Cho | G06F 1/1677 |
| | | | 345/668 |
| 2015/0316394 A1* | 11/2015 | Kim | G01R 33/0094 |
| | | | 324/207.2 |
| 2016/0259378 A1* | 9/2016 | Oliver | H04M 1/7246 |
| 2016/0275648 A1* | 9/2016 | Honda | G06F 1/1618 |
| 2017/0010657 A1* | 1/2017 | Schneider | G06F 1/3206 |
| 2017/0075391 A1* | 3/2017 | Longo | H04M 1/0212 |
| 2018/0081483 A1* | 3/2018 | Camp | G06F 3/016 |
| 2019/0129511 A1* | 5/2019 | Clark | G06F 3/0202 |
| 2019/0278337 A1* | 9/2019 | Hu | G06F 1/1677 |
| 2020/0096579 A1* | 3/2020 | Renda | G06F 1/1688 |
| 2020/0241827 A1* | 7/2020 | Aurongzeb | G06F 1/1616 |
| 2020/0392759 A1* | 12/2020 | Morrison | G06F 1/1607 |
| 2021/0232234 A1* | 7/2021 | Morrison | G06F 1/1681 |
| 2021/0240282 A1* | 8/2021 | Gajiwala | G06F 3/016 |
| 2022/0361266 A1* | 11/2022 | Ahmed | G06F 1/266 |
| 2023/0185449 A1* | 6/2023 | Lee | G06F 3/0346 |
| | | | 345/168 |
| 2024/0385655 A1 | 11/2024 | Balaji et al. | |
| 2024/0385657 A1 | 11/2024 | Balaji et al. | |
| 2024/0385661 A1 | 11/2024 | Balaji et al. | |
| 2024/0385696 A1 | 11/2024 | Balaji et al. | |

FOREIGN PATENT DOCUMENTS

| | | |
|---|---|---|
| JP | 2015181015 A | 10/2015 |
| JP | 1569358 S | 1/2017 |
| JP | 2017054471 A | 3/2017 |
| JP | 2017188141 A | 10/2017 |
| JP | 2018526750 A | 9/2018 |
| JP | 2019200574 A | 11/2019 |
| JP | 2022138769 A | 9/2022 |

OTHER PUBLICATIONS

Samsung, Galaxy Tab S8 / S7 Book Cover Keyboard, Black, available at: https://www.samsung.com/us/mobile/mobile-accessories/tablets/galaxy-tab-s8-galaxy-tab-s7-book-cover-keyboard-black-ef-dt870ubeguj/, accessed as early as Nov. 1, 2022.

Parsian, Mohammadali , U.S. Patent Application titled "Retention Mechanisms for Coupled Devices.", 40 pages.

* cited by examiner

KEYBOARD ACCESSORY FOR ELECTRONIC DEVICE

CROSS-REFERENCE TO RELATED APPLICATION(S)

This claims priority to U.S. Provisional Patent Application No. 63/503,382, filed 19 May 2023, and entitled "Keyboard Accessory for Electronic Device," the disclosure of which is hereby incorporated by reference.

FIELD

The described embodiments relate generally to electronic accessories and keyboards for computing devices. More particularly, the present embodiments relate to a detachable keyboard that includes sensors to determine keyboard position relative to a portable computing device and change input setting based on signals from the sensors.

BACKGROUND

Portable computing devices have grown in popularity and ubiquity worldwide in recent years. The convenience and adaptability of portable computing devices such as tablet computers and smart phones have therefore helped serve the needs of users for many purposes. When using a portable computing device such as a tablet computer or smart phone, it is common to use an external input device such as a keyboard, trackpad, or mouse. Although convenient for increased productivity and ease of input, traditional external input devices can be inconvenient to use for various reasons. External input devices can remain active while in undesirable positions, such as when stowed behind or underneath a tablet computer. External input devices can also become detached when changing configurations, create an unstable or precarious position for the portable computing device, or lose functionality over time. As a result, there is a constant need for improvements in portable computing devices, particularly for associated cases of these systems.

SUMMARY

One or more examples of the present disclosure relates to a modular electronic device system. The modular electronic device system can include: a computing device including a first sensor, a processor, and a memory device; and an input device removably connected to the computing device at a hinge, the input device including a second sensor, wherein the memory device stores instructions that, when executed by the processor, cause the processor to: determine an angle of the computing device relative to a gravitational direction based on a first signal from the first sensor, determine an angle of the input device relative to the gravitational direction based on the second signal from the second sensor, determine a hinge angle between the computing device and the input device at the hinge based on the angle of the computing device and the angle of the input device, and change the input setting in response to determining the hinge angle. In some examples, changing the input setting comprises enabling the input device or disabling the input device; the processor is configured to enable the input device based on the hinge angle being within a first range of hinge angles, and the processor is configured to disable the input device based on the hinge angle being within a second range of hinge angles different from the first range of hinge angles.

In certain examples, the first range of hinge angles comprises 30 degrees to 120 degrees, and the second range of hinge angles comprises angles outside the first range of hinge angles. In at least one example, the processor is configured to change the input setting based on at least three consecutive sensor samples indicating the hinge angle is within the first range of hinge angles or the second range of hinge angles. In a particular example, the first sensor and the second sensor are configured to generate sensor signals at a sampling rate between about 10 Hertz and about 15 Hertz. In one example, the input device comprises a first Hall effect sensor and a second Hall effect sensor spaced apart from the first Hall effect sensor by a threshold spacing of at least three inches. In at least some examples, the computing device comprises a first pair of magnets comprising a first polarity configuration and a second pair of magnets comprising a second polarity configuration different from the first polarity configuration, and the first Hall effect sensor and the second Hall effect sensor are configured to identify one of the first polarity configuration or the second polarity configuration, depending on a positioning of the input device when abutted against the computing device. In at least one example, the processor is configured to change the input setting based on sensor data from the first Hall effect sensor and the second Hall effect sensor in addition to the hinge angle.

The present disclosure additionally relates to a keyboard. A keyboard can include: a set of key mechanisms, a trackpad adjacent to the set of key mechanisms, a first sensor, a second sensor, the second sensor positioned away from the first sensor, a processor, and a memory device storing instructions that, when executed by the processor, cause the processor to determine an input state for the keyboard based on a sensor signal from the first sensor and the second sensor. In at least one example, the input state comprises a first input state allowing the processor to transmit a signal to a computing device in response to user input to at least one of the trackpad or a key mechanisms of the set of key mechanisms. In a particular example, the input state comprises a second input state disallowing the processor to transmit a signal to a computing device in response to user input to at least one of the trackpad or a key mechanisms of the set of key mechanisms. In one example, the first sensor and the second sensor are configured to detect a polarity direction of a set of magnets positioned in a computing device.

In at least some examples, the first sensor and the second sensor are configured to detect individual polarities of discrete magnets in the set of magnets. In one or more examples, the first sensor and the second sensor are embedded within the trackpad. In at least one example, the first sensor and the second sensor are embedded at opposing corners of the trackpad. In a particular example, the keyboard further comprises a printed circuit board, wherein the first sensor, the second sensor, and one or more other sensors associated with the trackpad are in electrical communication with the printed circuit board.

The present disclosure additionally relates to a computing device. A computing device can include: a housing, a display portion formed within the housing, the display portion configured to present an on-screen keyboard for user input in a first input state, at least one sensor configured to generate gravity data comprising at least a roll angle and a pitch angle of the computing device, a processor, and a memory device storing instructions that, when executed by the processor, cause the processor to transmit a signal to at least one of the display portion or a keyboard based on the gravity data, wherein the signal comprises computer-executable instructions to change between the first input state and a second input state, the second input state configured for user input at the keyboard. In at least one example, the at least one sensor comprises an inertial measurement unit. In a particular example, the processor is configured to receive, from the keyboard, additional gravity data comprising at least a keyboard roll angle and a keyboard pitch angle. In one example, the processor is further configured to transmit the signal to at least one of the display portion or the keyboard based on the additional gravity data and the gravity data.

The present disclosure additionally relates to another example of a keyboard. A keyboard can include: a housing comprising a set of perimeter edges, a set of key assemblies positioned within the housing, and an elongated tail spanning along a width of the housing, the elongated tail comprising an attachment portion configured to removably connect with a computing device, and a flexible portion connected to the housing from a first end of the flexible portion to a second end of the flexible portion opposite the first end. As used herein, the terms elongated tail, retention element, and connection member refer to an elongated tail. The flexible portion can include an inner layer, an outer layer, and a flex circuit embedded between the inner layer and the outer layer, wherein the flexible portion comprises a uniform smoothness devoid of a surface aberration between the first end and the second end. In one or more examples, a flex filler layer is positioned laterally adjacent to the flex circuit between the inner layer and the outer layer; and a flex cover layer is positioned above the flex filler layer and the flex circuit, the flex cover layer further positioned between the inner layer and the outer layer.

In a particular example, the inner layer comprises a first interior surface, and the flex cover layer comprises a top and bottom surface, the top surface being adhered to the first interior surface, and the bottom surface being adhered to a topside of the flex circuit and the flex filler layer. In one example, the outer layer comprises a second interior surface; and a bottom side of the flex circuit and the flex filler layer are adhered to the second interior surface. In at least some examples, the flex circuit and the flex filler layer are kiss-cut to form a predetermined gap on each side of the flex circuit between the flex circuit and the flex filler layer. In one or more examples, the flex circuit comprises an imperceptible color and imperceptible shape when the flexible portion is viewed externally with an unaided human eye. In at least one example, the uniform smoothness is defined by an approximately constant distance between exterior surfaces of the inner layer and the outer layer from the first end to the second end. In a particular example, wherein the surface aberration includes a wrinkle or crease, whether protruding inward or outward relative to an exterior surface of at least one of the inner layer or the outer layer. In one example, when the keyboard is detached from the computing device, the flexible portion curves around and is attached to a back section of the attachment portion such that the flexible portion obscures the attachment portion from at least a rear viewing perspective.

The present disclosure additionally relates to another example of a keyboard. A keyboard can include: a keyboard body, a set of input keys positioned within the keyboard body; and a retention element, including a mating portion configured to removably connect with a computing device, and an adjustable portion connected to the keyboard body, the adjustable portion including an electrical conduit and a filler layer positioned laterally adjacent to the electrical conduit, wherein the electrical conduit and the filler layer are kiss-cut to form a predetermined gap between the electrical conduit and the filler layer. In some examples, an inner fabric layer and an outer fabric layer encompassing the electrical conduit and the filler layer. In one or more examples, the predetermined gap is sized to accommodate for shrinkage of at least one of the inner fabric layer or the outer fabric layer. In a particular example, the electrical conduit and the filler layer comprise a same thickness. In one example, the predetermined gap is between 0.1 mm and 0.5 mm.

The present disclosure additionally relates to another example of a keyboard. A keyboard can include: a keyboard frame comprising a perimeter edge that defines a keyboard frame width, a set of key mechanisms supported by the keyboard frame, and a connection member. The connection member can include a rigid bar extending a length of the perimeter edge of the keyboard frame, the rigid bar comprising an electrical connector configured to removably connect to a computing device, and a front side spanning the length of the perimeter edge and a rear side spanning the length of the perimeter edge, the rear side opposing the front side; and a pliant flap attached to the rigid bar and the keyboard frame, the pliant flap being contiguous from a first end to a second end, and the pliant flap being configured to at least partially wrap around and connect to the rear side of the rigid bar.

In some examples, the pliant flap comprises a first point of attachment to the keyboard frame and a second point of attachment to the rigid bar, and a distance between the first point of attachment and the second point of attachment allows the keyboard to rotate 180 degrees relative to the computing device and while still attached to the computing device. In one or more examples, in a first keyboard configuration, the pliant flap at least partially obscures the rigid bar in at least one or more viewing angles of the keyboard, and in a second keyboard configuration, the pliant flap at least partially exposes the rigid bar in at least one or more viewing angles of the keyboard. In a particular example, the first keyboard configuration comprises a closed mode configuration or a typing mode configuration, and the second keyboard configuration comprises a relative positioning between the keyboard and the computing device defining a hinge angle of 180 degrees. In one example, the pliant flap comprises a predefined rigidity allowing the keyboard to remain attached to the computing device at hinge angles ranging from 0 degrees to 180 degrees.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
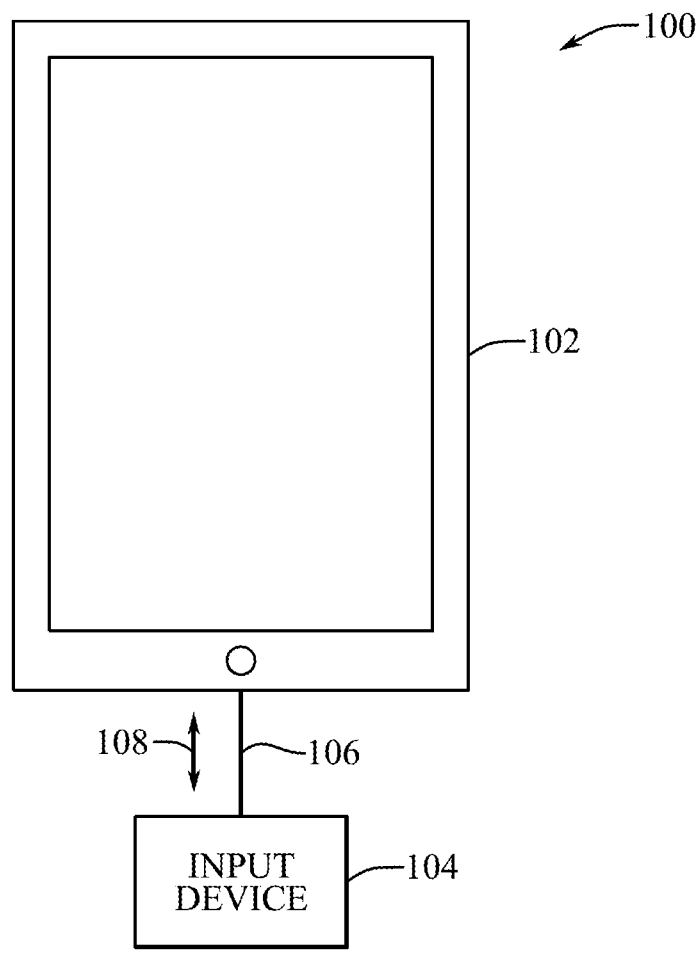
FIG. 1 shows an example modular electronic device system.

Reference will now be made in detail to representative embodiments illustrated in the accompanying drawings. It should be understood that the following descriptions are not intended to limit the embodiments to one preferred embodiment. To the contrary, it is intended to cover, explain, and illustrate alternatives, modifications, and equivalents which should be viewed as being included within the spirit and scope of the described embodiments as defined herein and by the appended claims.

The following disclosure relates to a modular electronic device system that can implement a variety of electrical connectors, sensors, configurations of material, and functional components (e.g., magnets). Such elements can be used to provide myriad different device interactions and user experiences.

Aspects of the present disclosure include a computing device and an input device, each of which can include sensors of various types (e.g., Hall effect sensors, magnetometers, accelerometers, fingerprint scanners, etc.). These sensors can generate signals which are interpreted by the computing device to identify the orientation of the input device relative to the computing device. Based on the interpretation of the signals generated by the sensors included in the computing device and the input device, the computing device can change one or more input settings of the input device. For example, the input setting can include enabling the input device or disabling the input device, changing the functionality of the input device, changing illuminating portions of the input device, similar functions, and combinations thereof. To illustrate, many computing devices, such as a touch screen tablet computing device, can be used in several positional configurations such as a "typing" mode where the computing device is upright and the input device is positioned substantially horizontal in front of the computing device, a "flipped" mode where the display portion of the computing device faces opposite the input device (e.g., the input device is positioned behind the back of the display portion), and a "closed" mode where the computing device is not in use and the input device covers the display of the computing device, in addition to other positional configurations. A user can use an input device such as a keyboard to aid functionality of a computing device. Without components to detect the orientation of the input device in relation to the computing device, computing devices are often limited in terms of certain functionality because input devices can remain active (even when not intended or wanted) when in certain positions, such as when stowed behind or underneath a tablet computer, thereby leading to battery drain, unintended inputs, and other unwanted effects.

The present disclosure also relates to an input device including an elongated tail which is attachable to the computing device and is capable of various input configurations, as may be desired by the user. The elongated tail can include a flexible portion containing materials of various physical properties affecting the functionality, flexibility, and movement of the input device. The elongated tail of the input device can allow the input device to remain connected to the computing device in various positional configurations. Other systems may become unattached when transitioning from one positional configuration to another, reducing the functionality of the input device. The elongated tail can also facilitate an electrical connection between the computing device and the input device. In some embodiments, the electrical connection can also include a flex circuit within the flexible portion of the elongated tail. The flex circuit within the flexible portion of the elongated tail can be imperceptible to the unaided human eye. In some cases, the construction of the tail may be configured to hide the presence and appearance of the flex circuit or other internal components in the tail while still enabling flexure of the tail into multiple different orientations relative to the input area of the input device and the body of the connected computing device. Manufacturing processes described herein can also allow for increased functionality and longevity of the modular electronic device system.

These and other embodiments are discussed below with reference to FIGS. 1-15. However, those skilled in the art will readily appreciate that the detailed description given herein with respect to these figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a modular electronic device system 100 in accordance with one or more examples of the present disclosure. As shown, the modular electronic device system 100 includes a computing device 102. In particular implementations, the computing device 102 includes a tablet computing device. Computing device 102 can include at least one sensor, a processor, and a memory device. In some embodiments, the modular electronic device system 100 also includes an input device 104. Input device 104 can be removably connected to computing device 102 via a connection 106 and can include at least one sensor. In some embodiments, the sensors contained in the computing device 102 and the input device 104 can be Hall effect sensors, inertial measurement units, accelerometers, or other devices usable to detect orientation of the computing device relative to a reference direction (e.g., relative to a gravitational direction). As used herein, the term "gravitational direction" refers to Earth's direction of gravitational pull towards the Earth's surface. Further, although gravity's pull is unidirectional, a gravitational direction can also be interpreted as a linear axis extending in either direction (whether towards or away from the Earth's surface). Relatedly, the term "gravity data" refers to information representing a spatial orientation or position. Gravity data can include a relative orientation relative to a gravitational direction. Additionally or alternatively, gravity data can include positional data, such as data from an altimeter, gyroscope, accelerometer, inertial measurement unit (IMU), similar devices, and combinations thereof. As used herein, an inertial measurement unit (IMU) refers an electronic device capable of measuring a force, angular rate, and/or an orientation of an object in three-dimensional space. An IMU can specifically include a combination of accelerometers, gyroscopes, and, in certain cases, magnetometers to detect rotation of the IMU about three perpendicular axes of rotation and/or displacement of the IMU along those axes. In particular implementations, gravity data can include roll, pitch, and yaw relative to a reference plane (e.g., a ground surface substantially perpendicular to a gravitational direction). The modular electronic device system 100 can also include a connection 106, configured to transmit and/or receive signals between the computing device 102 and the input device 104 (as indicated by the bi-directional arrow 108).

In some embodiments, the processor contained in computing device 102 can determine an angle of the computing device 102 relative to a gravitational direction by obtaining the signal from the sensor contained in the computing device 102 (e.g., positioned in or on a housing or body structure of the computing device 102). The processor contained in computing device 102 can also determine an angle of the input device 104 relative to a gravitational direction by obtaining the signal received from the sensor contained in the input device 104. Using these two computed angles obtained through the sensors contained in computing device 102 and input device 104, the processor can determine a hinge angle between the computing device 102 and the input device 104. As used herein, the term "hinge angle" refers to one or more angles between the computing device and the input device. For example, the hinge angle can be the physical angle between one axis (or plane) of the computing device and one axis (or plane) of the input device. The connection 106 may comprise a hinge structure (e.g., an elastic tail structure) connecting the computing device 102 to the input device 104 and holding the devices 102, 104 together at the hinge angle. In some examples, a first hinge angle can be defined between one axis of the computing device and one axis of the input device and a second hinge angle can be defined between a second axis of the computing device and a second axis of the input device which are positioned differently from the first axes of the computing device and the input device. In response to detecting or measuring the calculated hinge angle, the computing device 102 can send a signal 108 through the connection 106 to the input device 104, thereby changing an input setting of input device 104.

Any of the features, components, parts, including the arrangements and configurations thereof shown in FIG. 1 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 1.

Figure 2:
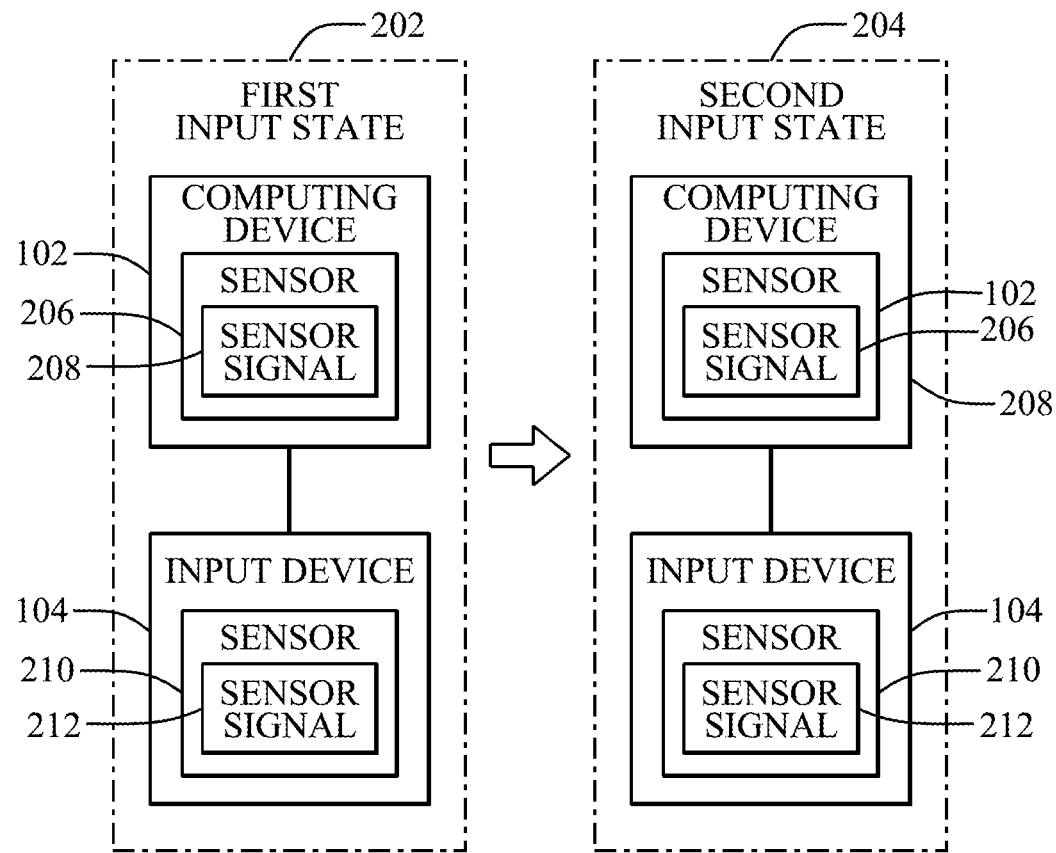
FIG. 2 shows an example modular electronic device system in which a computing device updates an input state in response to a change in signal from a sensor.

FIG. 2 illustrates a first input state 202 and a second input state 204 of the modular electronic device system 100. As used herein, the terms "input state" or "input setting" refer to the characterization, alteration, or processing of user input to the input device 104. In some embodiments, changing the input state (or input setting) comprises enabling the input device 104 or disabling the input device 104. The input device 104 may be enabled by providing power to the input device 104 from a power source (e.g., within the computing device 102) and may be disabled by cutting off power to the input device 104 from the power source.

As further shown, the computing device 102 can include at least one sensor 206. As used herein, the term "sensor" refers to a device configured to sense, detect, capture, measure, or estimate certain properties (such as, for example, a color or intensity of light or other electromagnetic radiation, a magnitude or direction of a magnetic field, a voltage, a resistance, a movement, a vibration, similar physical properties, or combinations thereof). Thus, a sensor can generate sensor data or sensor signals (e.g., the sensor can output electrical signals or can react to changes in the physical properties by changing its electrical properties, and a controller or other electronic device can detect the output signals or changes to the electrical properties) based on a detected property. Examples of a sensor can include a camera, image sensor, light detector, optical transducer, photovoltaic sensor (e.g., solar cell), photoresistor, phototransistor, photodiode, photodetector, pyroelectric detector, etc. Additional examples of a sensor include an ambient light sensor, photometer, light meter, illuminance meter, radiometer, optometer, datalogger, lux meter, chroma meter, spectrometer, spectrophotometer, spectroradiometer, charge coupled device, active-pixel sensor, etc. Still other examples of sensors include different sensing devices, such as an accelerometer, gyroscope, magnetometer, inclinometer, barometer, infrared sensor, global positioning system sensor, Hall effect sensor, etc.

In these or other examples, the sensor 206 can generate the sensor signal 208 in a variety of ways. In at least one example, the sensor 206 generates the sensor signal 208 in response to detecting a certain positional configuration of the computing device 102 relative to a gravitational direction. For example, a sensor such as an accelerometer, gyroscope, or IMU within the computing device 102 can generate a sensor signal that represents at least one of a roll position, a yaw position, and/or a pitch position of the computing device 102 relative to a ground surface or relative to a gravitational direction.

Similarly, the input device 104 can include a sensor 210 that can generate a sensor signal 212. In one or more examples, the sensor 210 generates the sensor signal 212 in response to detecting a certain positional configuration of the input device 104 relative to a gravitational direction. For example, a sensor such as an accelerometer, gyroscope, or IMU within the input device 104 can generate a sensor signal that represents at least one of a roll position, a yaw position, and/or a pitch position of the input device 104 relative to a ground surface or relative to a gravitational direction.

Based on the combination of the sensor signals 208, 212, the computing device can respond by switching from the first input state 202 to the second input state 204 (or maintain a current input state). For example, based on the sensor signals 208, 212, a processor in the computing device 102 can determine that the input device 104 is in a positional configuration that satisfies criteria to switch from the first input state 202 to the second input state 204. Such criteria, such as a hinge angle, are discussed further below in relation to FIG. 3. The input states may include having the input device completely enabled for input, partially enabled and partially disabled for input, or completely disabled for input. Furthermore, input settings may include different settings for the visual appearance of the input device, such as, for example, changing a backlight power setting (e.g., on or off) or color/hue (e.g., red or white) in response to the value of the determined hinge angle and positioning of the computing device 102 relative to the gravitational direction. In some embodiments, the input states may include different input modes, such as a typing input mode in which keys or buttons on a keyboard of the input device perform a first set of functions (e.g., typing letters and numbers), an application-specific input mode in which the same keys or buttons perform a second set of functions (e.g., controlling a cursor, computer game feature, or GUI object), a book-like mode (wherein the display of the computing device is in a portrait orientation and input to the input device is reconfigured to accommodate the user's 90-degree rotated perspective of the system 100), a trackpad-only mode (e.g., where only a trackpad or trackpad portion of the input device is enabled while keys or buttons are disabled), a keyboard-only mode (e.g., where only a keyboard or key portion of the input device is enabled), or another application- or setting-based input mode.

Any of the features, components, parts, including the arrangements and configurations thereof shown in FIG. 2 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 2.

Figure 3:
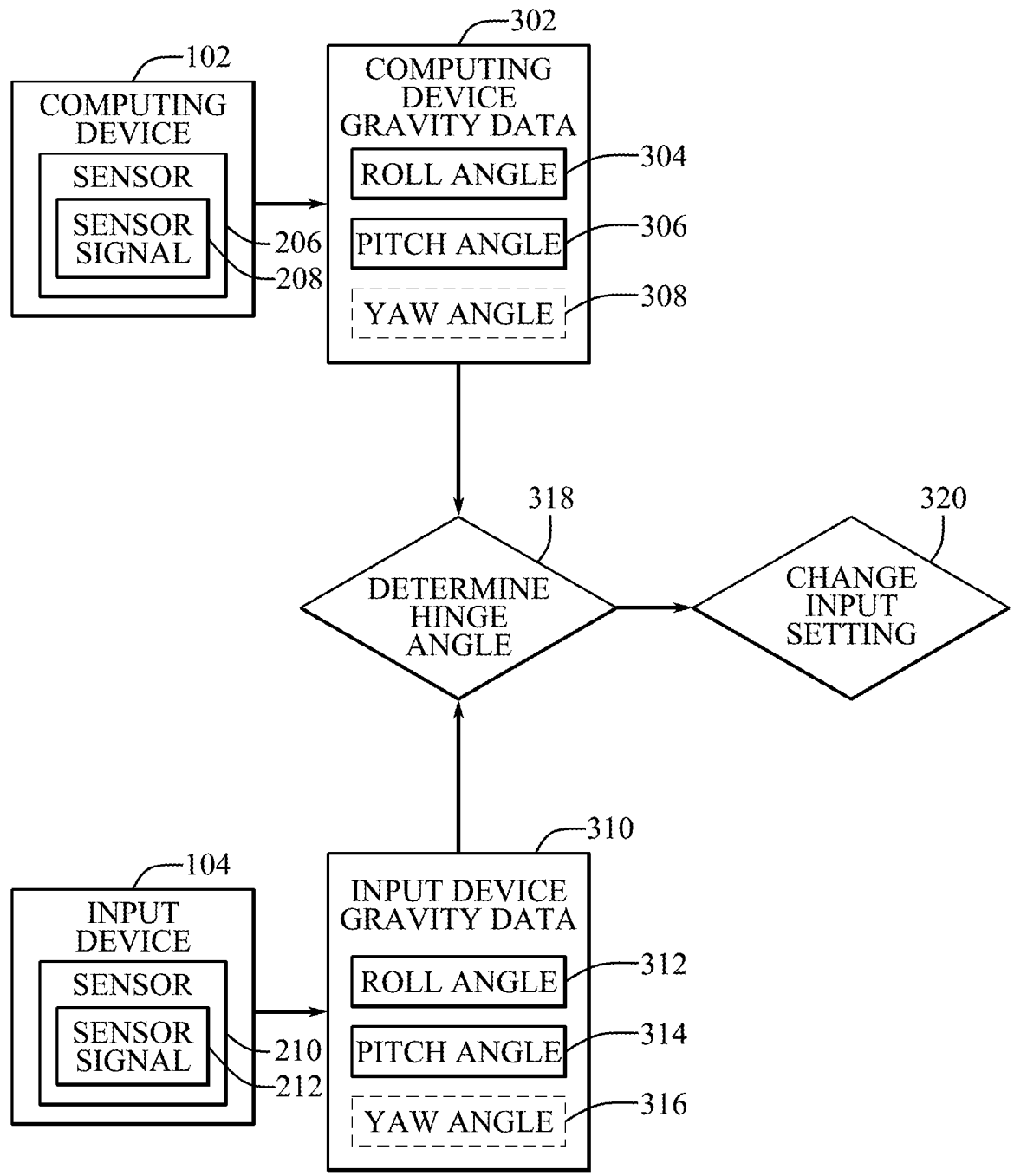
FIG. 3 shows a method of updating an input setting.

FIG. 3 illustrates the computing device 102 updating an input setting 320 in accordance with one or more examples of the present disclosure. In particular, FIG. 3 illustrates the computing device 102 updating an input setting 320 in response to signal 208 and signal 212 obtained from one or more sensors, as discussed above.

The following provides one example implementation. In particular, the sensors 206, 210 can include but are not limited to Hall effect sensors, inertial measurement units, and accelerometers. In some embodiments, the computing device 102 can include at least one inertial measurement unit (or other sensor 206) that creates a sensor signal 208 comprising computing device gravity data 302. The input device 104 can include at least another inertial measurement unit (or other sensor 210) that creates a sensor signal 212 comprising input device gravity data 310. The computing device gravity data 302 and the input device gravity data 310 can include relative orientations of the computing device 102 and input device 104 relative to the gravitational direction. A hinge angle 318 between the computing device 102 and the input device 104 can be determined based on the gravitational data 302, 310 provided by the inertial measurement units included within the computing device 102 and the input device 104. If the hinge angle meets a set of predetermined conditions, such as falling within a range of hinge angles 318, the computing device can determine to update an input setting 320 (or else maintain a current input setting). In other embodiments, at least one accelerometer included in the computing device 102 and at least one accelerometer contained in the input device 104 can generate sensor signals 208, 212 comprising computing device gravity data 302 and input device gravity data 310 to be used in determining a hinge angle 318 and changing an input setting 320 as described above.

In these or other examples, the sensors 206, 210 can generate respective sensor signals representative of gravity data (i.e., the gravity data 302, 310) at a variety of sampling rates. In some embodiments, the sampling rate of the sensors 206, 210 contained in the computing device 102 and the input device 104 is between about 10 Hertz and about 15 Hertz. In at least some examples, the foregoing sampling rates can provide improved accuracy of relative device motion, whereas lower sampling rates can lead to delayed alteration of input states (or inaccurate results) in some cases. Additionally or alternatively, the foregoing sampling rates can provide an optimized power draw, whereas sampling at higher rates can consume too much power for typical mobile computing devices in certain cases. Other sampling rates, of course, can be utilized. For instance, in other examples, the sample rate is lower (e.g., between about 5 Hertz and about 10 Hertz) or higher (e.g., between about 15 Hertz and about 80 Hertz). The term "about" can interpreted as covering up to +/−10 percent of a given value or, in some cases, up to +/−20 percent of a given value.

Figure 7:
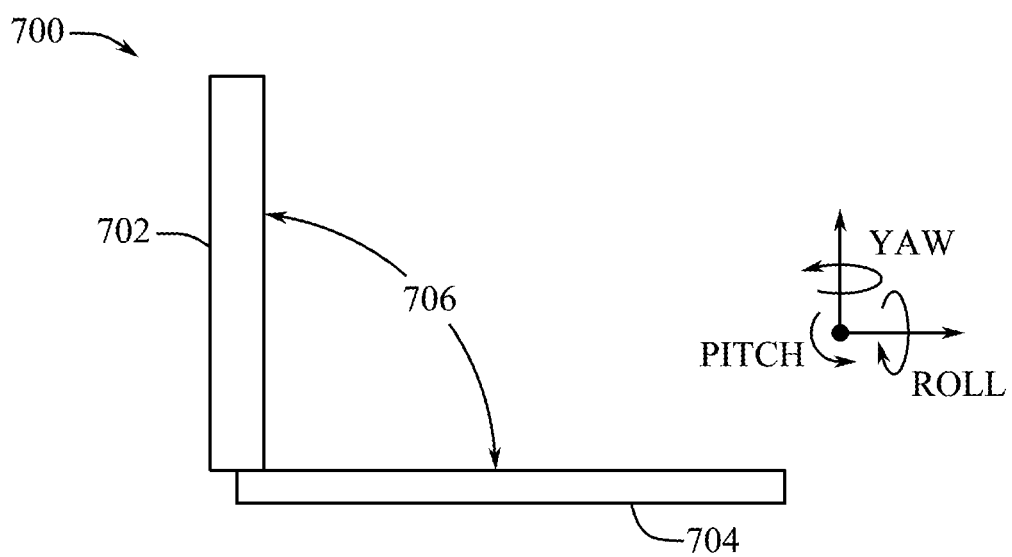
FIG. 7 shows a side view of an example computing device.

As shown in FIG. 3, the gravity data 302 can include the roll angle 304, pitch angle 306, and yaw angle 308 of the computing device 102. Similarly, the gravity data 310 can include roll angle 312, pitch angle 314, and yaw angle 316 of the input device 104. Thus, the gravity data may include an angle of the computing device 102 relative to three perpendicular reference axes, such as relative to an X-axis, Y-axis, and Z-axis of a Cartesian coordinate system. As used herein, a roll angle refers to the angle of rotational displacement about an axis extending from the front to the back of a modular electronic device system 100 (as shown in FIG. 7 for reference) (e.g., an X-axis). Relatedly, a pitch angle refers to the angle of rotational displacement about an axis extending from a left end to a right end of a modular electronic device system 100 and perpendicular to the axis about which roll angle is calculated (as shown in FIG. 7 for reference) (e.g., a Y-axis). Furthermore, as used herein, a yaw angle refers to the angle of rotational displacement about an axis extending substantially vertically though the modular electronic device system 100, being perpendicular to both the axis about which roll angle is calculated and the axis about which pitch angle is calculated (as shown in FIG. 7 for reference) (e.g., a Z-axis).

As depicted via dashed lines in FIG. 3, the yaw angles 308, 316 may be optional. In some embodiments, the yaw angles 308, 316 can help identify a rotational displacement between the computing device and the input device about the vertical axis. This can further be used by the computing device 102 to change an input setting 320. Additionally, in some embodiments, the roll angles 304, 312 may be optional.

To illustrate, the foregoing angles can be used to determine a hinge angle 318 between the computing device 102 and the input device 104. The hinge angle 318 is the difference between the roll angle 304, pitch angle 306, or yaw angle 308 of the computing device 102 and the corresponding roll angle 312, pitch angle 314, or yaw angle 316 of the input device 104. For example, if the computing device 102 experiences a pitch angle 306 of 115 degrees relative to horizontal and the input device experiences a pitch angle 314 of 10 degrees relative to horizontal, the hinge angle 318 is determined to be 105 degrees. The computing device 102 can then change an input setting 320 based on this hinge angle (or else maintain a current input setting). A similar process of subtraction can be used to determine a hinge angle based on the roll angle 304 or the yaw angle 308 of the computing device 102 and the roll angle 3012 or yaw angle 316 of the input device 104. In some embodiments, the hinge angle can include multiple angles based on the difference in roll, pitch, and yaw angles of the computing device 102 and the input device 104. In these embodiments, one or more of the difference in roll, pitch, and yaw angles must meet some criteria allowing the computing device to change an input setting. In some embodiments, this criteria can be a set of angles as discussed further below in relation to FIG. 3.

For example, the computing device 102 could comprise a tablet computing device 102, and the input device 104 could comprise a keyboard. The calculated hinge angle 318 can change depending on the orientation of the input device relative to the computing device 102 in three directions. Calculating the hinge angle 318 between the tablet computing device 102 and the keyboard 104 in various directions would allow at least one input setting 320 to be changed in accordance with this orientation. In some embodiments, changing the input setting comprises enabling the input device 104 or disabling the input device 104.

In some embodiments, the computing device can change the input setting 320 when the hinge angle 318 falls within one of a first set of hinge angles or a second set of hinge angles. The first set of hinge angles can comprise 30 degrees to 120 degrees. The second range of hinge angles can comprise angles outside the first range of hinge angles. In some embodiments, the first set of hinge angles can represent the range of angles within which the user is expected or intended to use the input device 104. Therefore, the input device 104 can be enabled via the input setting 320 when the hinge angle 318 falls within the first set of hinge angles. The input device 104 can be disabled when the hinge angle 318 falls within the second range of hinge angles. This allows the user to use the computing device 102 without accidental input from the input device 104, such as when viewing media.

It will be appreciated that a wide variety of hinge angles can be implemented to change the input setting 320, including hinge angles that differ from those just mentioned. In some examples, the ranges of hinge angles used to change the input setting 320 depend on the computing device 102 being in a vertical position (e.g., substantially perpendicular to a ground surface or within about a 20 degree range of angles of that position). For instance, at a hinge angle of zero degrees when the computing device 102 is positioned vertically and the input device 104 abuts the computing device 102, the input device 104 can be disabled. However, as the input device 104 is drawn away from the vertical position against the computing device 102, the input device 104 can be awakened or activated for use (e.g., for typing where the input device 104 can be positioned at 90 degrees from the computing device 102). At a certain point while the computing device 102 is still in the vertical position, the input device 104 can be deactivated when the input device 104 is drawn even farther away from the zero hinge angle (e.g., to a 180 degree hinge angle where the input device 104 is vertically aligned with the computing device 102). The input device 104 can remain deactivated at even larger hinge angles as the input device 104 is flipped around to abut the backside of the computing device 102).

In another example, the ranges of hinge angles used to change the input setting 320 depend on the computing device 102 being positioned in a "screen up" configuration (e.g., substantially horizontal or parallel to a ground surface with the display portion facing upwards, or within about a 20 degree range of angles of that position). For instance, at a hinge angle of zero degrees when the computing device 102 is positioned screen up and the input device 104 abuts the computing device 102, the input device 104 can be disabled. However, as the input device 104 is drawn upwards and away from the horizontal position against the computing device 102, the input device 104 can be awakened or activated for use. At a certain point while the computing device 102 is still in the screen up position, the input device 104 can be deactivated when the input device 104 is drawn even farther away from the zero hinge angle (e.g., to a 270 degree hinge angle where the input device 104 is arranged vertically relative to the computing device 102). The input device 104 can remain deactivated at even larger hinge angles as the input device 104 is flipped around to face down and abut the backside of the computing device 102).

In yet another example, ranges of hinge angles used to change the input setting 320 depend on the computing device 102 being positioned in a "screen down" configuration (e.g., substantially horizontal or parallel to a ground surface with the display portion facing downwards or within about a 20 degree range of angles relative to that position). For instance, at a hinge angle of zero degrees when the computing device 102 is positioned screen down and the input device 104 abuts the computing device 102, the input device 104 can be disabled. However, as the input device 104 is drawn downwards and away from the horizontal position against the computing device 102, the input device 104 can be awakened or activated for use. At a certain point while the computing device 102 is still in the screen down position, the input device 104 can be deactivated when the input device 104 is drawn even farther away from the zero hinge angle (e.g., to a 180 degree hinge angle where the input device 104 is aligned horizontally with the computing device 102). The input device 104 can remain deactivated at even larger hinge angles as the input device 104 is flipped around to face up and abut the backside of the computing device 102).

In one or more examples, the computing device 102 can change the input setting 320 in a manner that can help improve accuracy. For example, the processor of the computing device 102 can change the input setting 320 based on a threshold number of consecutive sensor readings (e.g., at least three consecutive sensor samples) indicating the hinge angle 318 is within the first range of hinge angles or the second range of hinge angles. In some examples, this method helps combat false/noisy readings from the sensors 206, 210 such that the computing device 102 does not change the input setting 320 by enabling or disabling the input device 104 at undesirable times.

Any of the features, components, parts, including the arrangements and configurations thereof shown in FIG. 3 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 3.

Figure 4:
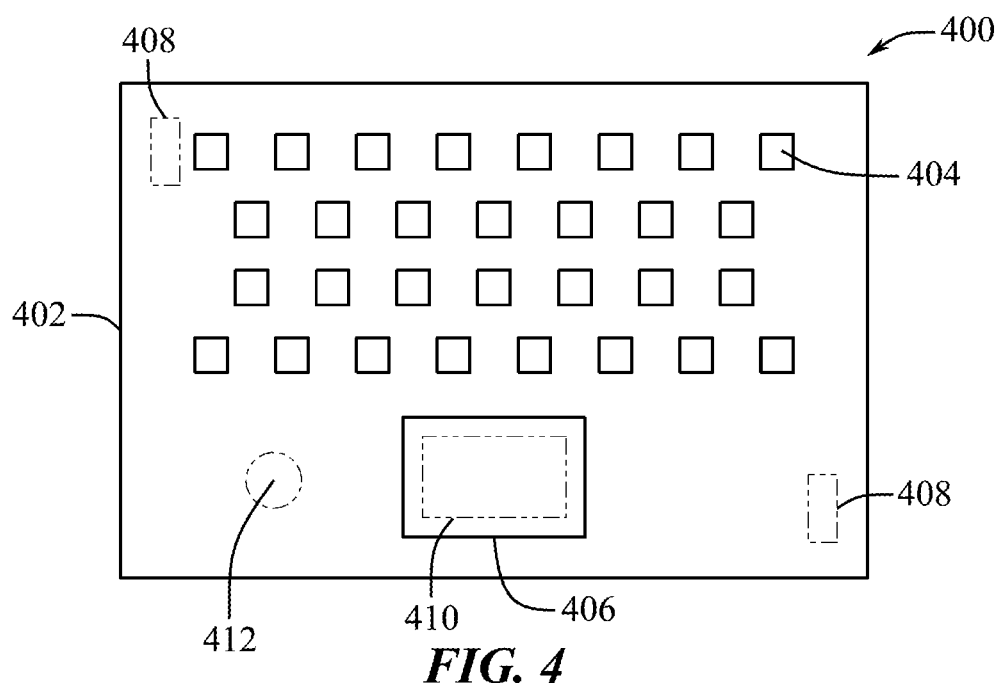
FIG. 4 shows a top view of an example input device.

FIG. 4 illustrates a keyboard 400 in accordance with one or more examples of the present disclosure. As shown, the keyboard 400 can include a keyboard frame 402, key mechanisms 404, and a trackpad 406 adjacent to the key mechanisms 404. The frame 402 may in some cases be a housing or enclosure for other components of the keyboard 400. Thus, as used herein, the terms "keyboard frame" and "housing" refer to the portion of the keyboard within which other elements are positioned and included. For example, the keyboard frame can be made of metal, plastic, or other materials and provides structural integrity to the keyboard as well as providing space for a trackpads, key mechanisms, or other elements to be positioned within. As used herein, the term "key mechanism" can include any physical mechanism positioned on a keyboard designed to be pressed by a user. In some examples, the key mechanism can be operable to create a representation of a character, number, symbol, or function of the input device.

The keyboard 400 can also include a pair of Hall effect sensors 408, a printed circuit board (PCB) 410, and at least one other sensor 412. The printed circuit board 410 can include a processor and a memory device coupled to the printed circuit board 410. The memory device can store instructions that, when executed by the processor, cause the processor to change the input setting of the keyboard 400 based on a signal from the first Hall effect sensor 408 and the second Hall effect sensor 408. In some cases, the processor can also change the input setting of the keyboard 400 based on a signal from the first Hall effect sensor 408 and the second Hall effect sensor 408, in addition to an identified hinge angle (discussed above). The at least one other sensor 412 can comprise an accelerometer or an inertial measurement unit and may be an embodiment of sensor 210. The at least one other sensor 412 can provide gravitational data to the processor, which uses the gravitational data to determine a hinge angle as shown in FIGS. 2-3. Although not shown here in FIG. 4, the computing device 102 can comprise a corresponding pair of magnets discussed below in relation to FIG. 6.

In some embodiments, the pair of Hall effect sensors 408 are spaced apart. This can be achieved with a variety of positional configurations and spacings. In some embodiments, the first Hall effect sensor 408 is spaced apart from the second Hall effect sensor 408 by a threshold spacing of at least three inches. The Hall-effect sensors 408 are spaced apart in a redundant fashion to help protect against accidental triggering of the sensors 408 (e.g., due to an external device such as a headphone case with a magnet). Thus, by spacing apart the pair of Hall effect sensors, an accidental trigger (and associated change of input state) can be avoided. In certain implementations, the likelihood of an accidental triggering event affecting both Hall effect sensors 408 and resulting in an undesirable change in input setting is greatly reduced by spacing the Hall effect sensors 408 apart by a threshold spacing of at least three inches. When both Hall effect sensors 408 experience a true triggering event based on computing device magnets correspondingly positioned adjacent to the pair of Hall effect sensors 408, an input setting can be changed by the processor in accordance with instructions stored on the memory device.

Any of the features, components, parts, including the arrangements and configurations thereof shown in FIG. 4 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 4.

Figure 5:
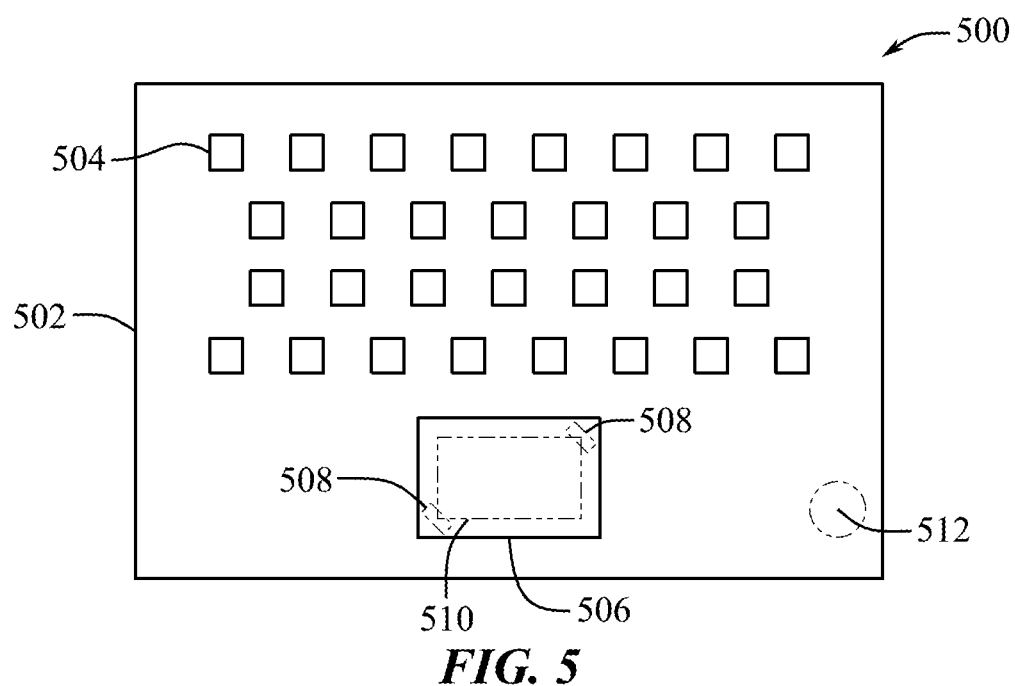
FIG. 5 shows a top view of another example input device.

FIG. 5 illustrates another embodiment of a keyboard 500 in accordance with one or more examples of the present disclosure. As shown in FIG. 5, the keyboard 500 comprises the similar elements described above in relation to the keyboard 400 of FIG. 4. The keyboard 500 can include a keyboard frame 502, key mechanisms 504, and a trackpad 506 adjacent to the key mechanisms 504. The keyboard 500 can also include a pair of Hall effect sensors 508, a memory device, and one or more other sensors 512. The elements shown in FIG. 5 are the same as or similar to those described above in relation to FIG. 4.

However, FIG. 5 shows a different positional configuration of the pair of Hall effect sensors 508. As depicted, the Hall effect sensors 508 are positioned within the trackpad 506. The pair of Hall effect sensors 508 can be positioned at different locations relative to the trackpad 506. In specific embodiments, the pair of Hall effect sensors 508 are positioned at corners (e.g., opposing corners) of the trackpad 510 to maximize the distance between the sensors 508 for reasons explained above.

As discussed above, spaced apart sensors can provide redundant trigger protection. Additionally, in the implementation of FIG. 5, the pair of Hall effect sensors 508 can efficiently use electrical wiring coupled to the printed circuit board 510. Additionally, with sensors 408 or 508 being positioned in opposite corners of their respective support structures (i.e., 402 or 510), the positioning of the sensors 408, 508 may be determined more easily relative to magnetic elements of the computing device, as discussed in connection with magnets 608, 610 in device 600 of FIG. 6.

Any of the features, components, parts, including the arrangements and configurations thereof shown in FIG. 5 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 5.

Figure 6:
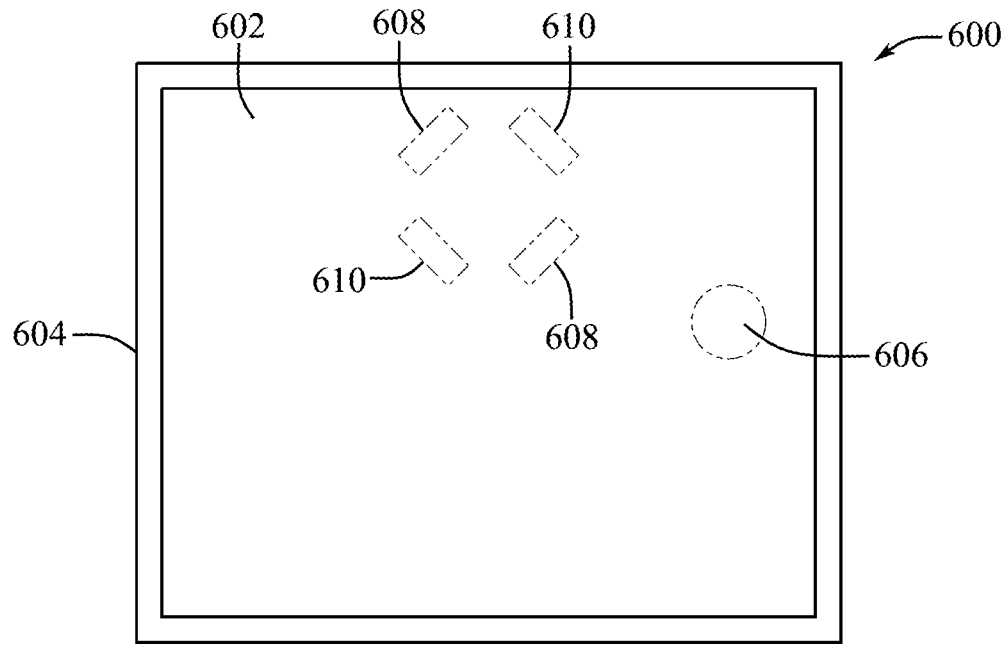
FIG. 6 shows a front view of an example computing device.

FIG. 6 illustrates a computing device 600 including a housing 604 and a display portion 602 formed within the housing. As used herein, "display portion" refers to a screen or other user interface portion. Example types of a display include a light emitting diode (LED) display, quantum LED (QLED) display, organic LED (OLED) display, liquid crystal display, digital light processing display, plasma panel display, rear-projection display, a micro display, etc. The display portion may include capacitive touch capability.

As seen in FIG. 6, the computing device 600 can include pairs of magnets 608, 610 embedded within the computing device 600. These magnets can include different polarity configurations. For example, magnets in opposing corners of the configuration shown in FIG. 6 can have opposite polarities.

Based on the unique polarities (or polarity configurations) of the pairs of magnets 608, 610, keyboard sensors (e.g., Hall effect sensors 508) can identify a particular positional relationship of the computing device 600 relative to the input device (e.g., 500). For example, based on the Hall effect sensors of the keyboard detecting a first polarity configuration of the magnets 608 and/or 610, a processor (within the computing device or the keyboard) can determine to change or maintain the input setting in a manner supplemental to, or in alternative to, the methods described in connection with FIG. 3. Similarly, based on the Hall effect sensors detecting a second polarity configuration, a processor (within the computing device or the keyboard) can determine to change or maintain the input setting. It will be appreciated that the detected polarity configuration is dependent on which pair of magnets (whether the pair of magnets 608 or pair of magnets 610) is positioned proximate to the Hall effect sensors of the keyboard. Thus, in one configuration, the Hall effect sensors may be approximated with a first pair of magnets 608 (e.g., when the trackpad 506 is to the front of the magnets 608 and display portion 602), and in a second configuration, the Hall effect sensors may be approximated with the second pair of magnets 610 (e.g., when the trackpad 506 is to the rear of the magnets 610 and display portion 602). Each pair of magnets 608, 610 may have a different polarity configuration (e.g., one pair 608 has north-polarity facing forward and the other pair 610 has south-polarity facing forward), so the polarity of the magnetic field(s) sensed by the Hall effect sensors 508 may be used to determine whether the trackpad 506 is positioned to the front or to the rear of the display portion 602. Furthermore, in some embodiments, such as when input device 400 is used with a computing device, the Hall effect sensors 408 may be positioned outside the trackpad 406, and the magnets of the computing device can be in corresponding outer corners of the housing of the computing device.

The sensors (e.g., 408/508) and magnets (e.g., 608) can be used in conjunction with the determined hinge angle 318 to control or change an input setting 320 of the system (e.g., 100). For example, in some configurations, the computing device gravity data 302 may indicate that the pitch angle 306 is vertical (e.g., 90 degrees relative to a horizontal plane or parallel to the gravitational direction), and the input device gravity data 310 may indicate that the pitch angle 314 is also vertical. In that case, the position of the input device 104 relative to the front of the display of the computing device may be indefinite. For example, the input device 104 could be covering the front of the display portion or may be positioned behind the computing device 102 and not covering the display portion. Accordingly, the sensors and magnets of the system 100 may be referenced to assist in determining whether the input device 104 is in the closed/display-covering position or in a flipped/behind-display position. In the closed position, an input setting of the computing device 102 may be set to a first state (e.g., the display may be disabled since it is covered and inaccessible), and in the flipped position, the input setting of the computing device 102 may be set to a second state (e.g., the display may be enabled).

Based on the input state, the display portion can present different graphical representations. For example, the computing device 600 can cause the display portion 602 to display an on-screen keyboard for a first input state. As another example, the computing device 600 can cause the display portion 602 to remove the on-screen keyboard for a second input state (e.g., when the keyboard is active).

As further shown in FIG. 6, the computing device 600 includes at least one sensor 606 that can generate gravity data of the computing device 600 in a same or similar manner as described above. The computing device 600 can also include a processor and a memory device. The memory device can store instructions that, when executed by the processor, cause the processor to transmit a signal to at least one of the display portion or a keyboard based on the gravity data. The signal can include computer-executable instructions to change between the first input state and a second input state, the second input state configured for user input at the keyboard. In some embodiments, the gravity data generating sensor 606 can be an inertial measurement unit. The processor can also be configured to receive, from the keyboard, additional gravity data comprising a keyboard roll angle, a keyboard pitch angle, and a keyboard yaw angle.

The sensor 606 for generating gravity data can operate in tandem with the Hall effect sensors of the keyboard operable to detect the pairs of magnets 608, 610. Thus, based on a combination of gravity data and Hall effect sensor data, a processor (within the computing device or the keyboard) can determine to change an input setting.

Any of the features, components, parts, including the arrangements and configurations thereof shown in FIG. 6 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 6.

FIG. 7 illustrates a modular electronic device system 700 in accordance with one or more examples of the present disclosure. The system 700 may include the comparable features of system 100. As shown, the modular electronic device system 700 can include a hinge angle 706 between the computing device 702 and the input device 704. As previously explained, this hinge angle 706 is used to change an input setting. In some embodiments, the computing device 702 can change the input setting when the hinge angle 706 is within a range or hinge angles. For example, the input device 704 can have a first input setting (e.g., it can be enabled to allow typing (or other input to the input device 704)) when the hinge angle 706 is between 40 degrees and 120 degrees. Other examples of a range of hinge angles include but are not limited to a hinge angle 706 of between 45 degrees and 135 degrees, between 30 degrees and 150 degrees, or between 50 degrees and 140 degrees. When the hinge angle 706 is outside of this range of hinge angles, the input device 704 can have a second input setting (e.g., be disabled by the computing device 702).

Any of the features, components, parts, including the arrangements and configurations thereof shown in FIG. 7 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 7.

Figure 8:
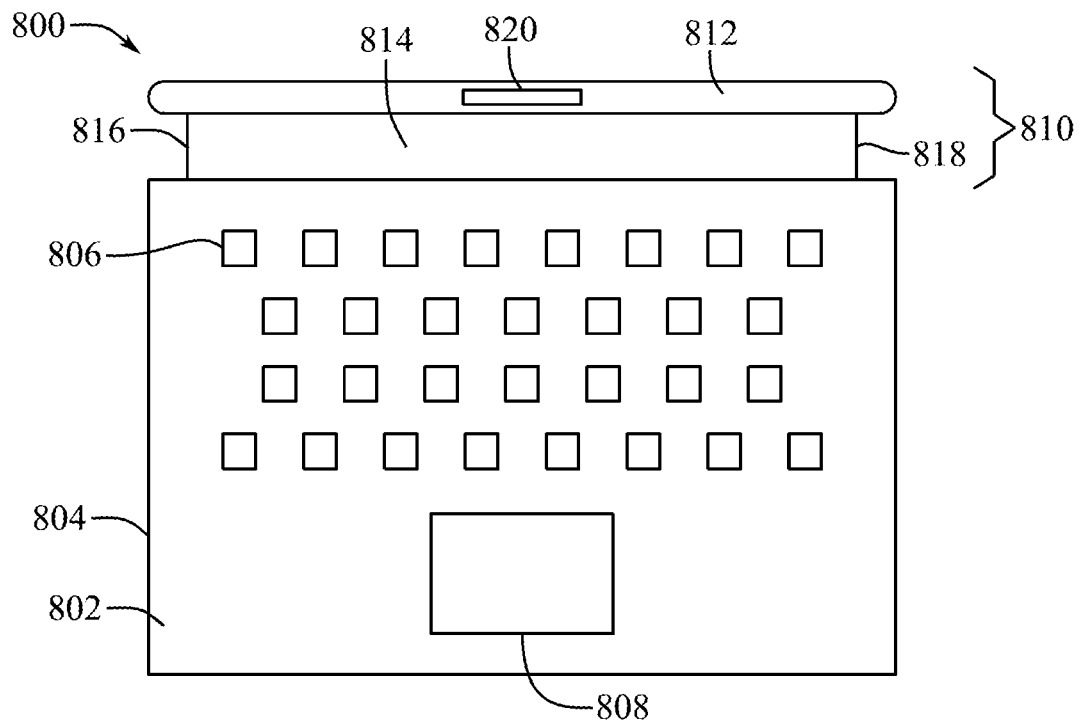
FIG. 8 shows a top view of an example keyboard.

FIG. 8 illustrates a keyboard 800 in accordance with one or more examples of the present disclosure. The keyboard 800 can comprise the same or similar elements described above in connection with system 100 or input devices 104, 400, and 500. In particular, the keyboard 800 can include a housing 802 comprising a set of perimeter edges (e.g., edge 804 extending along one side of the rectangular perimeter shown in FIG. 8), a trackpad 808, and a set of key assemblies 806 positioned within the housing 802. As used herein, the term "key assemblies" refers to any component receptive to user input at keys of a keyboard (whether a mechanical keyboard, a touch screen keyboard, etc.). This can include, but is not limited to, key mechanisms, keyboard touch screen display keys, capacitive touch elements, and the like.

As shown, the keyboard 800 also includes an elongated tail 810. As used herein, the terms "elongated tail," "retention element," and "connection member" refer to a portion of an input device that extends past the keyboard frame or housing and provides physical and/or electrical connection of the keyboard 800 to a computing device. In some embodiments, the elongated tail 810 is laterally elongated and has a greater lateral side-to-side width than its length measured between the frame 802 and the rear end of an attachment portion 812 thereof.

The elongated tail 810 can include the attachment portion 812 at its rear end. As used herein, the terms "attachment portion," "mating portion," and "rigid bar" refer to a portion of the elongated tail 810 that can be removably attached to a computing device. This attachment portion 812 is configured to be removably coupled to a computing device, such as computing device 102 as shown in FIG. 1, and provide electrical communication via an electrical connector 820. As used herein, the term "electrical connector" can include one or more elements for the transmission of data and/or power between components connected to the electrical connector. In some examples, an electrical connector includes at least one of an electrical contact (e.g., a set of electrical contact pads or pins), a magnetic contact, a pin, a port, a socket, a card reader, a male-female connection member, related circuitry (e.g., converters or protective electronic components), and combinations thereof. The attachment portion 812 is connected to a perimeter edge 804 of the keyboard housing 802 via a flexible portion 814 of the elongated tail.

As used herein, the terms "flexible portion," "adjustable portion," and "pliant flap" refer to a portion of the elongated tail that exhibits flexible properties. The flexible portion can include multiple layers that exhibit specific properties such as stiffness, color, durability, opacity, etc. The flexible portion 814 can extend from a first end 916 to a second end 918 along the width of the keyboard housing 802. The flexible portion 814 provides a flexible electrical connection between the keyboard 800 and the computing device 102. For example, the flexible portion 814 can allow the keyboard 800 and the computing device 102 to rotate relative to each other while still maintaining an electrical connection through the attachment portion 812. The flexible portion 814 can also provide additional or alternative functionality. For example, the flexible portion 814 can be constructed with a desired rigidity sufficient to prop up (e.g., hold at a position spaced away from a support surface) the computing device 102 or provide a particular viewing angle while the elongated tail 810 is attached to the computing device. As another example, the flexible portion 814 can include a desired rigidity that allows a user to lift the keyboard 800 and simultaneously also lift the computing device 102 via the grip on the keyboard 800 (e.g., in a manner similar to picking up a notebook computer).

In these or other examples, the elongated tail 810 can be aesthetically pleasing, with the flexible portion 814 being opaque and having a uniform visual appearance (as further described below). For example, the elongated tail 810 can include a smooth surface under which various components (e.g., a flex circuit) can be hidden.

Any of the features, components, parts, including the arrangements and configurations thereof shown in FIG. 8 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 8.

Figure 9:
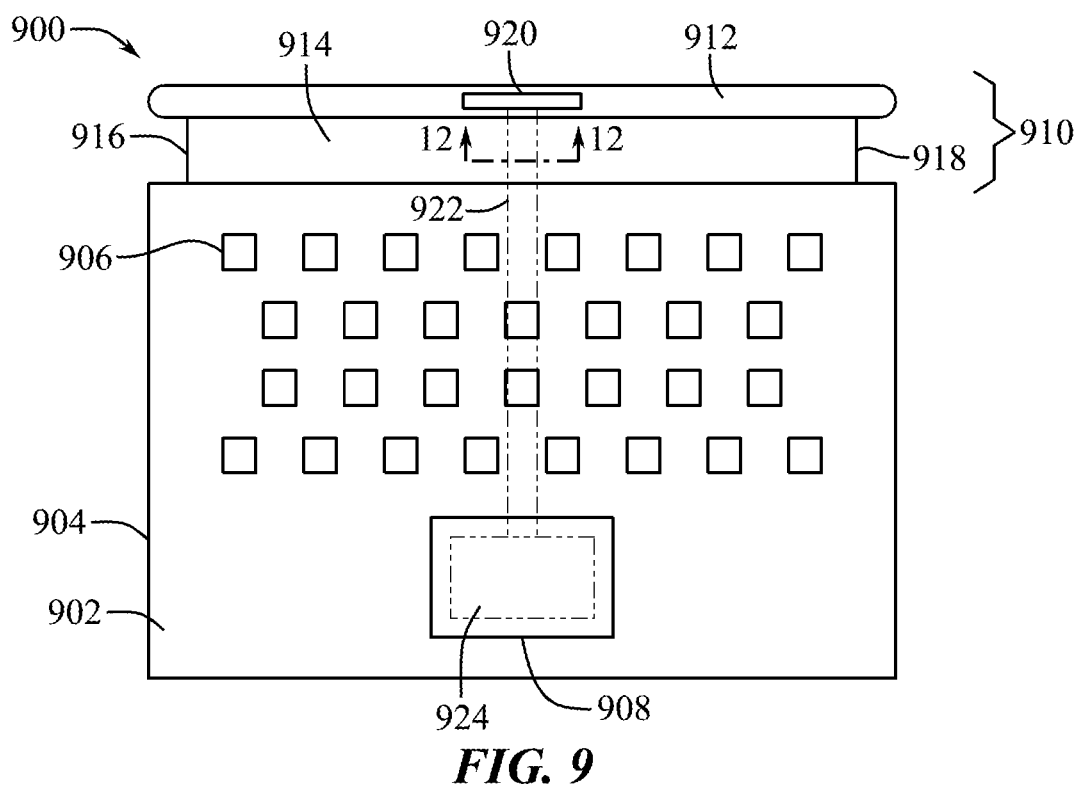
FIG. 9 shows a top view of the electrical connections in an example keyboard.

FIG. 9 illustrates a keyboard 900 in accordance with one or more examples of the present disclosure. The keyboard 900 can comprise the same or similar elements described above. The keyboard 900 can also include a printed circuit board 924 positioned within the keyboard housing 902. In some embodiments, the printed circuit board 924 can be positioned underneath or attached to the trackpad 908. As shown, the printed circuit board 924 is connected to a flex circuit 922. The flex circuit can extend from the printed circuit board 924, through the flexible portion 914, and to the electrical connector 920 in the attachment portion 912.

The flexible portion 914 can include an inner layer, an outer layer, and a flex circuit embedded between the inner layer and outer layer. Although the flex circuit is encased in the flexible portion 914 of the elongated tail 910, the flexible portion 914 can comprise a uniform smoothness devoid of a surface aberration between the first end 916 and the second end 918. Aberrations can include a wrinkle or crease, whether protruding inward or outward relative to an exterior surface of the flexible portion 914. The flex circuit 922 serves as an electrical connection from the printed circuit board 924 to the computing device 102. In some embodiments, the presence of the flex circuit 922 includes an imperceptible color and imperceptible shape when the flexible portion 914 is viewed externally with an unaided human eye. This adds to the aesthetic properties of the elongated tail 910, creating a sleek and streamlined look. As used herein, an "unaided human eye" is a naked eye of an average human observer having regular vision and that is not augmented or supplemented by lenses, microscopes, cameras, or other scopes or equipment used to discern wavelengths beyond the natural human eye.

Any of the features, components, parts, including the arrangements and configurations thereof shown in FIG. 9 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 9.

Figure 10:
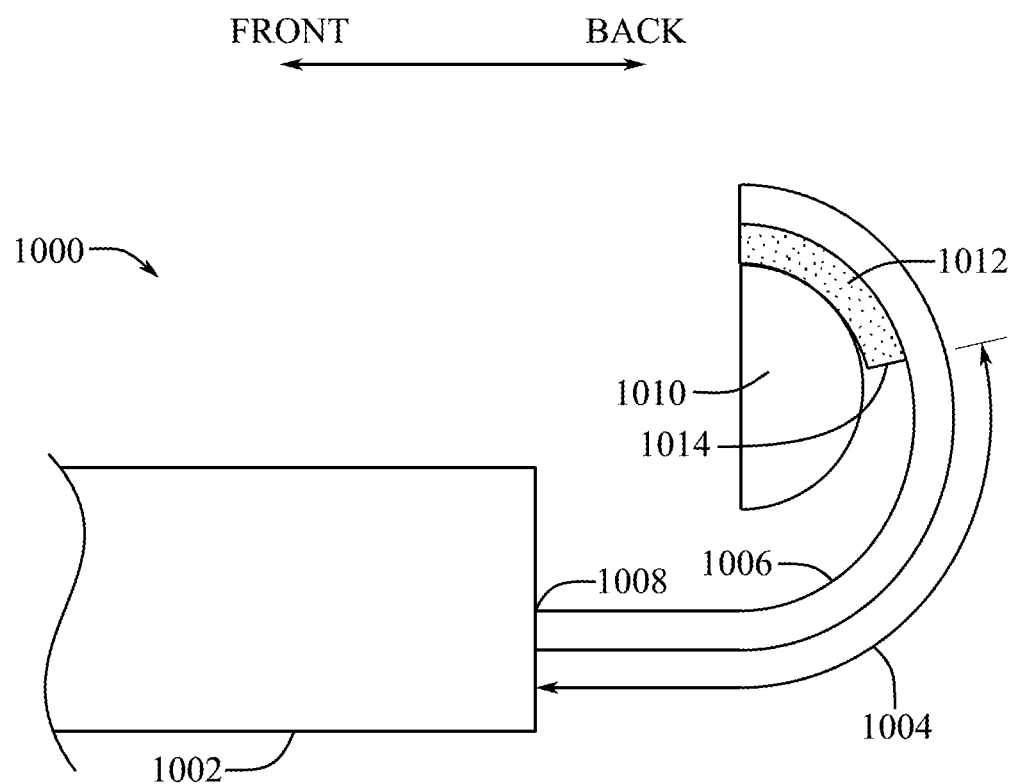
FIG. 10 shows a close up of a pliant flap and attachment portion of an input device.

FIG. 10 illustrates a side view of an elongated tail 1000 in accordance with one or more examples of the present disclosure. The elongated tail 1000 can comprise the same or similar elements described above in connection with elongated tail 810. As shown in FIG. 10, the flexible portion 1006 can be connected to the keyboard housing 1002 at a first point of attachment 1008. The flexible portion 1006 can be connected to the top or back side of the attachment portion 1010 via an adhesive connection 1012 (e.g., at a second point of attachment 1014). By attaching the flexible portion 1006 to the reverse side of the attachment portion 1010, the attachment portion 1010 can hidden when viewed from the back side of the elongated tail 1000, such as when the tail 1000 and computing device are viewed from behind, or when the keyboard housing 1002 is in a closed position relative to a front surface of the computing device. In this manner, only the smooth and consistent back side of the tail 1000 may be visible when the system is in a closed configuration or is viewed from behind. This contributes to a sleek and uniform aesthetic desired by many users. The smooth curvature of the back surface of the tail 1000 may also improve carrying comfort for the system, similar to a handle.

It will be appreciated that the elongated tail 1000 comprises a variety of different design factors that can contribute to different properties, such as rigidity or flexibility. One example of a design factor includes a length 1004 between the first point of attachment 1008 and the second point of attachment 1014. For example, a longer length 1004 can make the flexible portion 1006 more pliable. This increased flexibility can allow the rear side of the flexible portion 1006 to rest on the surface supporting the input device and computing device (e.g., below them). By contrast, if the length 1004 is shorter, the flexible portion 1006 can be stiffened. In so doing, the computing device 102 may be suspended above the surface below and/or create a certain viewing angle. In some cases, if the flexible portion 1006 is too stiff, this suspension can cause the computing device 102 to bounce or move while the input device is in use unless input forces to the input device are dampened. In this manner, the length of the flexible portion 1006 allows the stability of the computing device 102 to be controlled. The adhesive connection 1012 between the flexible portion 1006 and the attachment portion 1010 is also variable in length. The length of the adhesive connection 1012 can also determine the physical angle, rigidity, and stability of the attachment portion 1010 relative to the computing device 102 (not shown).

Any of the features, components, parts, including the arrangements and configurations thereof shown in FIG. 10 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 10.

Figure 11:
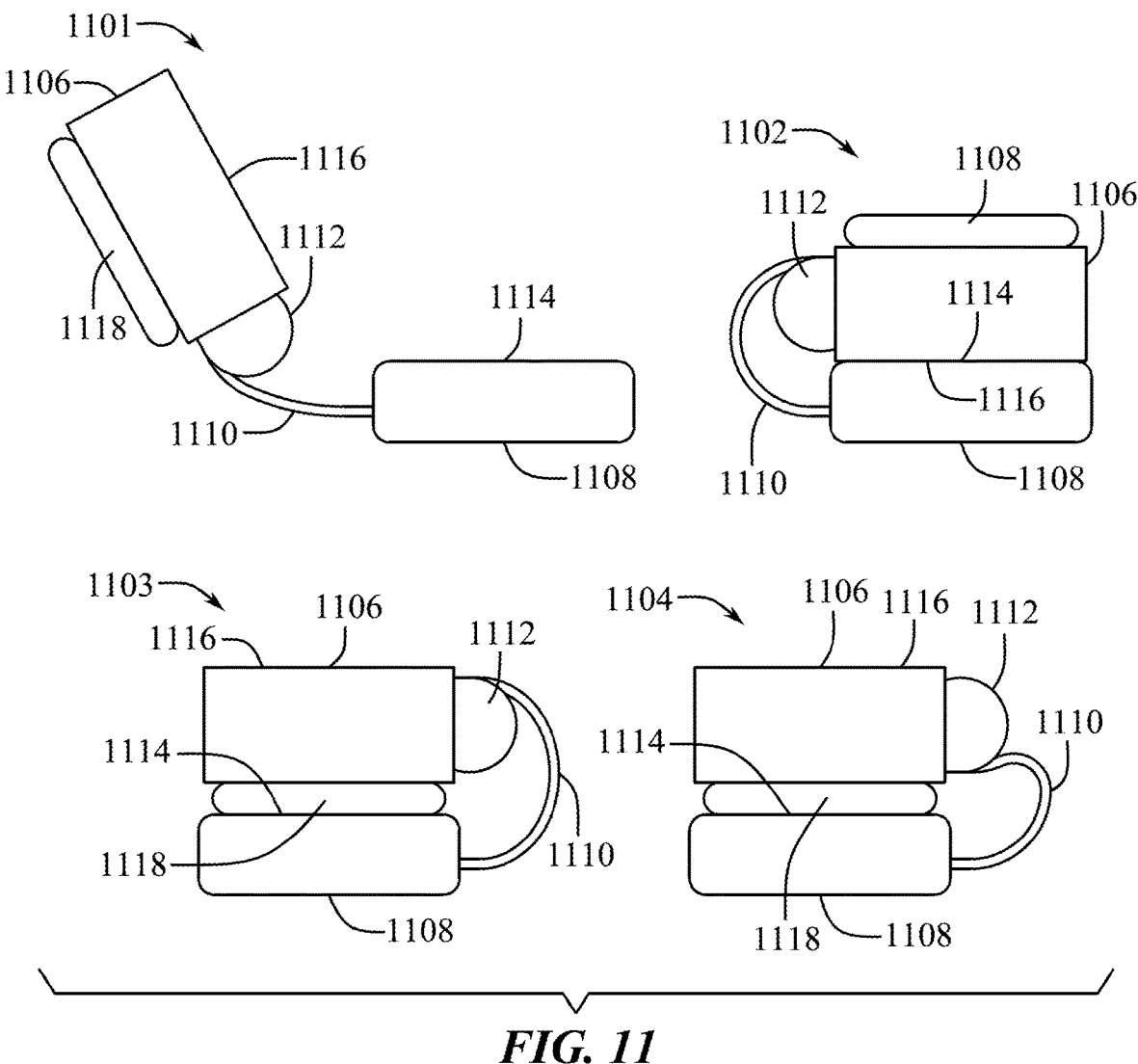
FIG. 11 shows an example modular electronic device system in multiple configurations.

FIG. 11 illustrates several example configurations of the modular electronic device system 100 in accordance with one or more examples of the present disclosure. The elongated tail 1110 can comprise the same or similar elements described above, such as tail 1000. The first configuration 1101 shows the modular electronic device system 100 in one usable mode (e.g., a typing mode). In this configuration, the computing device 1106 is attached to the attachment portion 1112 of the elongated tail 1110 of the keyboard 1108 (e.g., with a display portion 1116 of the computing device 1106 and key assemblies 1114 (which may or may not protrude) of the keyboard 1108 positioned in an open clam-shell configuration). As described above, the flexible portion of the elongated tail 1110 can be attached to the rear side of the attachment portion 1112, hiding the attachment portion 1112 when viewed from the rear in this configuration. In some embodiments, the computing device 1106 can be supported solely by the elongated tail 1110, while in other embodiments, the computing device 1106 and elongated tail 1110 may rest on the surface beneath, such as a table. In some examples, the benefit of resting the computing device 1106 on the elongated tail 1110, which in turn rests on the surface below is an increase in stability. Additionally, the computing device 1106 may include a stand or leg that supports the computing device 1106 in addition to the tail 1110.

A second configuration 1102 shows the modular electronic device system 100 in a closed condition. In this configuration, the key assemblies 1114 face, contact, or at least partially abut the front surface, input surface, or viewing surface of the display portion 1116 of the computing device 1106. It will be appreciated that the flexible portion of the elongated tail 1110 can be capable of enduring many cycles (e.g., thousands of cycles) of opening and closing, while still maintaining an electrical connection between the keyboard 1108 and the computing device 1106, regardless of configuration.

A third configuration 1103 shows the modular electronic device system 100 in what is termed as stow, storage, or rear support mode. Stow mode allows the user to continue using the computing device 1106 with the display portion 1116 facing up or outwards. However, the keyboard assemblies 1114 of the keyboard 1108 are in abutment with, contacting, or facing the rear side of the computing device 1106 (e.g., in abutment with a rear cover 1118 thereof). This configuration shields or protects the key assemblies 1114, trackpad, and other possible components of the keyboard 1108 (e.g., when only the display portion 1116 is being utilized), thereby potentially limiting damage or unintended inputs. In stow mode, the attachment portion 1112 of the elongated tail 1110 is attached to the computing device 1106 in the opposite direction of the second configuration 1102, wherein the smooth rear surface of the tail 1110 terminates (at the attachment portion 1112) closer to the front surface of the display portion 1116 rather than closer to the rear surface (where the rear cover 1108 is positioned).

A fourth configuration 1104 shows the modular electronic device system 100 in a flipped mode. Flipped mode allows the keyboard 1108 to be rotated behind the computing device 1106 such that the rear side of the keyboard 1108, not containing the key assemblies 1114, abuts or faces the rear side of the computing device 1106. In configuration 1104, the key assemblies 1114 are positioned outward, facing an opposite direction as the display portion 1116. As shown, the flexible portion of the elongated tail 1110 bends to allow this configuration without separating from the computing device 1106. In some embodiments, the stiffness or length of the flexible portion could be altered such that the elongated tail 1110 automatically detaches from the computing device 1106 when rotated into flipped mode. This rigidity can enable the flexible portion to stay attached to the computing device 1106 can be within the range of 0 to 180 degrees. In at least these configurations, the elongated tail 1110 can provide both an electrical connection and a physical connection between the keyboard 1108 and the computing device 1106.

Any of the features, components, parts, including the arrangements and configurations thereof shown in FIG. 11 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 11.

Figure 12:
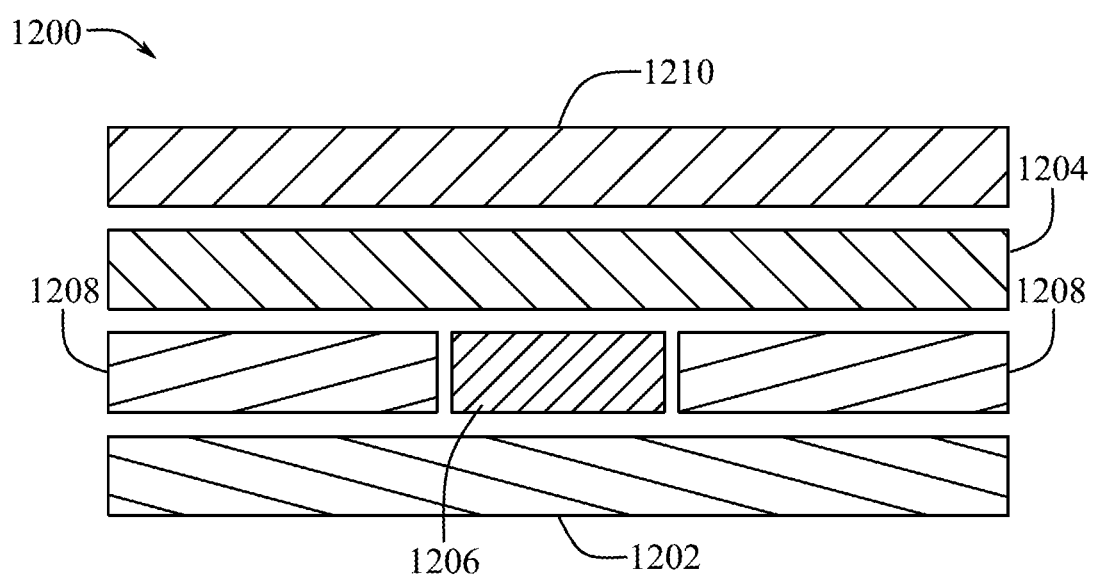
FIG. 12 shows a cross section of a pliant flap containing a flexible printed circuit.

FIG. 12 illustrates an end-facing cross section of a flexible portion 1200 of an elongated tail 1004 in accordance with one or more examples of the present disclosure. The cross-section may be through the tail 910 at flex circuit 922 along a horizontal section line extending across the page of FIG. 9 within the flexible portion 914. The elongated tail 1004 can comprise the same or similar elements described above. The flexible portion 1200 can include an inner layer 1202, an outer layer 1210 and a flex circuit 1206 embedded between the inner layer 1202 and outer layer 1210. The inner layer 1202 and outer layer 1210 can include a fabric material with certain opacity, color, and texture (as may be desired). The fabric material may be flexible and bendable with the tail.

In some embodiments, a filler layer 1208 can be positioned adjacent to the flex circuit 1206 and between the inner layer 1202 and the outer layer 1210 can be occupied by another material of the same thickness as the flex circuit. The filler layer 1208 positioned adjacent to the flex circuit 1206 can help prevent the inner layer 1202 and the outer layer 1210 from forming surface aberrations, such as wrinkles or creases that may otherwise form when material collapses to fill a void adjacent to the flex circuit 1206. Additionally, the filler layer 1208 can exhibit material properties such as stiffness and opacity that affect the function of the flexible portion. The material properties of the filler layer 1208 can differ from other layers and/or the flex circuit 1206. For example, a stiff filler layer 1208 can configure the elongated tail to detach from the computing device when placed in flipped mode. In some embodiments, the filler layer 1208 can match the material properties of the flex circuit such that the thickness, color, transparency/opacity, and smoothness are indistinguishable with the unaided eye through the inner layer 1202 or outer layer 1204.

In some embodiments, the flexible portion 1200 can include a cover layer 1204 in between the flex circuit 1206 and the outer layer 1210. The cover layer 1204 can be an internal layer that inhibits the flex circuit 1206 from being seen with an unaided human eye. In these embodiments, the cover layer 1204 can be a variety of colors and finishes to create an aesthetically pleasing design.

As the flexible portion cycles through different configurations of the modular electronic device system 100, it is possible for the inner fabric layer 1202 or outer fabric layer 1204 to shrink. This can cause the filler layer 1208 to shift and overlap with the flex circuit, disrupting the constant thickness from the first end of the flexible portion to the second end of the flexible portion. To help prevent the effects of shrinkage, one or more layers can include a predetermined gap relative to each other. For instance, a predetermined gap exists between the flex circuit 1206 and the filler layer 1208. In come embodiments, this gap can be between 0.1 mm and 0.5 mm. Myriad different manufacturing methods can be used to obtain this predetermined gap. In at least some implementations a kiss-cut process is used, which is described below in relation to FIG. 13.

Any of the features, components, parts, including the arrangements and configurations thereof shown in FIG. 12 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 12.

Figure 13:
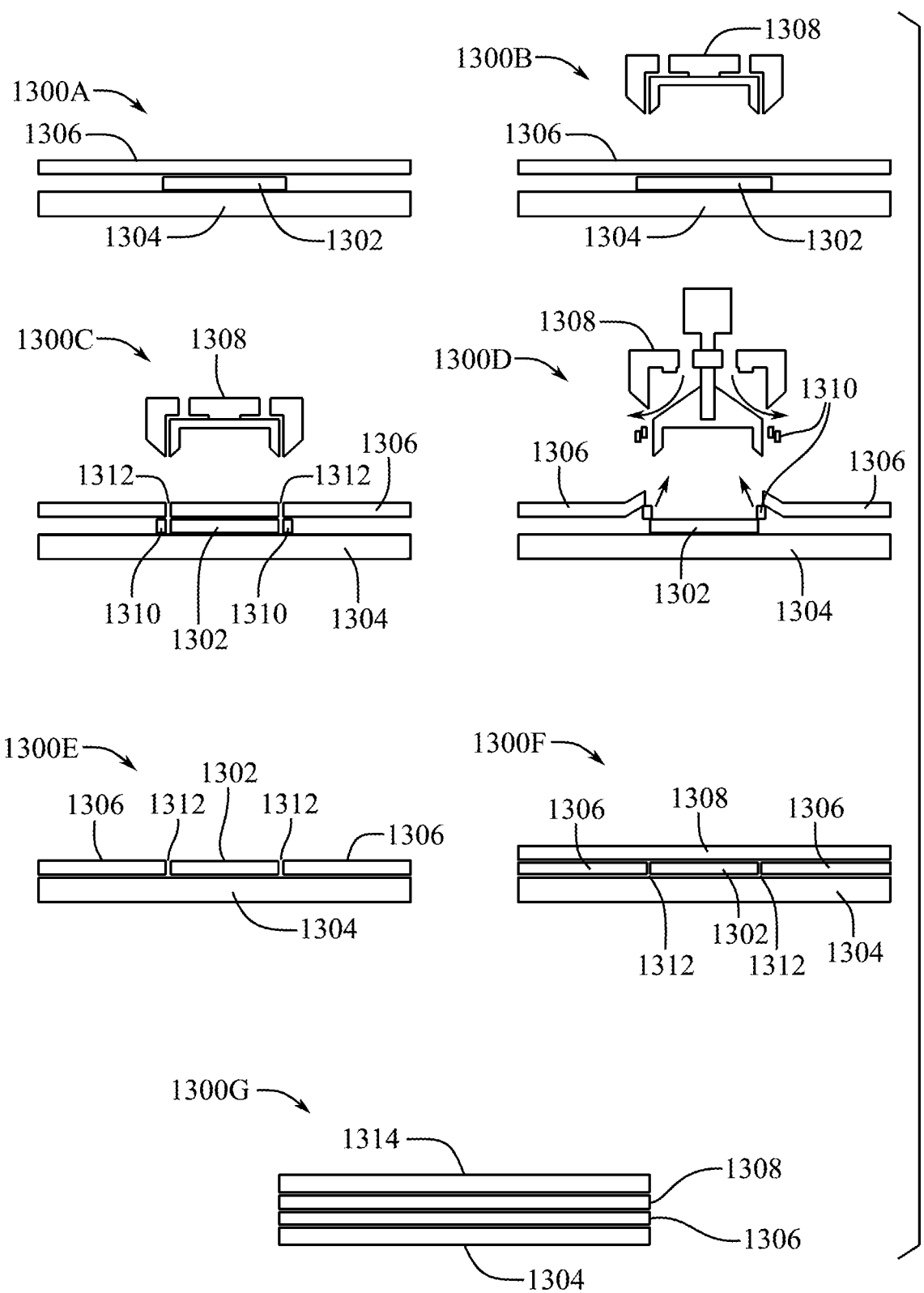
FIG. 13 shows a manufacturing process for producing a pliant flap containing a flexible printed circuit.

FIG. 13 illustrates a process of manufacturing the flexible portion in accordance with one or more examples of the present disclosure. In step 1300A, the flex circuit 1302 is placed between the inner layer 1304 and the filler layer 1306 of the flexible portion. Step 1300B shows the cutting tool 1308 preparing to cut the filler layer 1306 and the flex circuit 1302. As shown in step 1300C, a cutting tool 1308 cuts through both the filler layer 1306 and the flex circuit 1302 on either side of the flex circuit 1302, thereby removing a portion of the outer edges of the flex circuit 1302. By cutting this material, the cutting tool 1308 creates the predetermined gap 1312 between the flex circuit 1302 and the filler layer 1306. In step 1300D, the excess portions 1310 of the filler layer 1306 and the flex circuit 1302 are then extracted and ejected by the cutting tool 1308.

In step 1300E the filler layer 1306 is shown to lay next to the flex circuit 1302, maintaining the predetermined gap 1312. As used herein, the term "predetermined gap" refers to a space between elements that falls within a design range. For example, a predetermined gap can be a space of between 1 millimeter and 5 millimeters between two elements. In other examples, the predetermined gap can be a space between 2 millimeters and 7 millimeters. The process shown in FIG. 13 can manufacture a component with a predetermined gap of various ranges. Step 1300F shows how in some embodiments, a cover layer 1308 can be added over the top of the filler layer 1306. Step 1300G shows how an outer layer 1314 can then be applied over the top of cover layer 1308. The layers can be attached at each step with an adhesive. In some embodiments the adhesive may have physical properties such as stiffness or opacity that can affect both the physical properties and the aesthetic of the flexible portion.

Any of the features, components, parts, including the arrangements and configurations thereof shown in FIG. 13 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 13.

Figure 14:
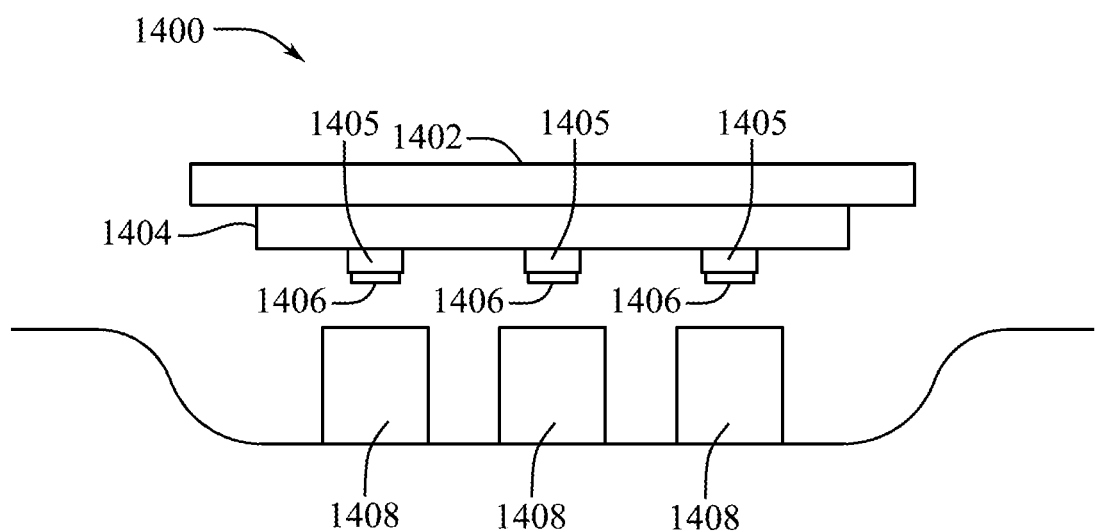
FIG. 14 shows a cross section of a track pad.

FIG. 14 illustrates a cross-section of an example trackpad assembly 1400 of a keyboard in accordance with one or more examples of the present disclosure. The keyboard can include a trackpad assembly 1400, including a glass layer 1402 and printed circuit. In some embodiments, the printed circuit board 1404 can be positioned under the glass layer 1402 of the trackpad. As a user places a point load on the trackpad of the keyboard, the printed circuit board 1404, and in particular, electrical components 1405 attached to the printed circuit board 1404 below, can experience strain. This strain can damage the electrical components 1405 either immediately or over time. To help mitigate the amount of stress/strain undergone by the electrical components 1405, some embodiments may include one or more stiffeners 1406 on the bottom side of the electrical components 1405. In some embodiments, the stiffeners 1406 can include a rigid material. For example, the stiffeners 1406 can include a stainless steel material. In some embodiments, the stiffeners 1406 can be attached to the printed circuit board 1404 via an adhesive. The adhesive can also contribute to a decrease in stress/strain experienced by the electrical components 1405.

In some embodiments, the trackpad assembly 1400 can also include at least one shim 1408 beneath the printed circuit board 1404. In some examples, the shims 1408 can limit the amount of deflection or displacement experienced by the trackpad and, in particular the electrical components 1405 attached to the printed circuit board 1404. For example, the printed circuit board 1404 and associated electrical components 1405 can deflect downwards in response to an applied load at the trackpad surface 1402. As the deflection of the printed circuit board 1404 and associated electrical components 1405 increases, so does the amount of undesired stress/strain experienced by the electrical components 1405. The shims 1408 can therefore advantageously provide a mechanical stop to the printed circuit board 1404 and associated electrical components 1405. The height of the shim 1408 can thus be chosen to allow a larger or smaller deflection of the trackpad to control stress/strain experienced by the electrical components 1405. In some embodiments, the shims 1408 can be stainless steel.

Any of the features, components, parts, including the arrangements and configurations thereof shown in FIG. 14 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 14.

Figure 15:
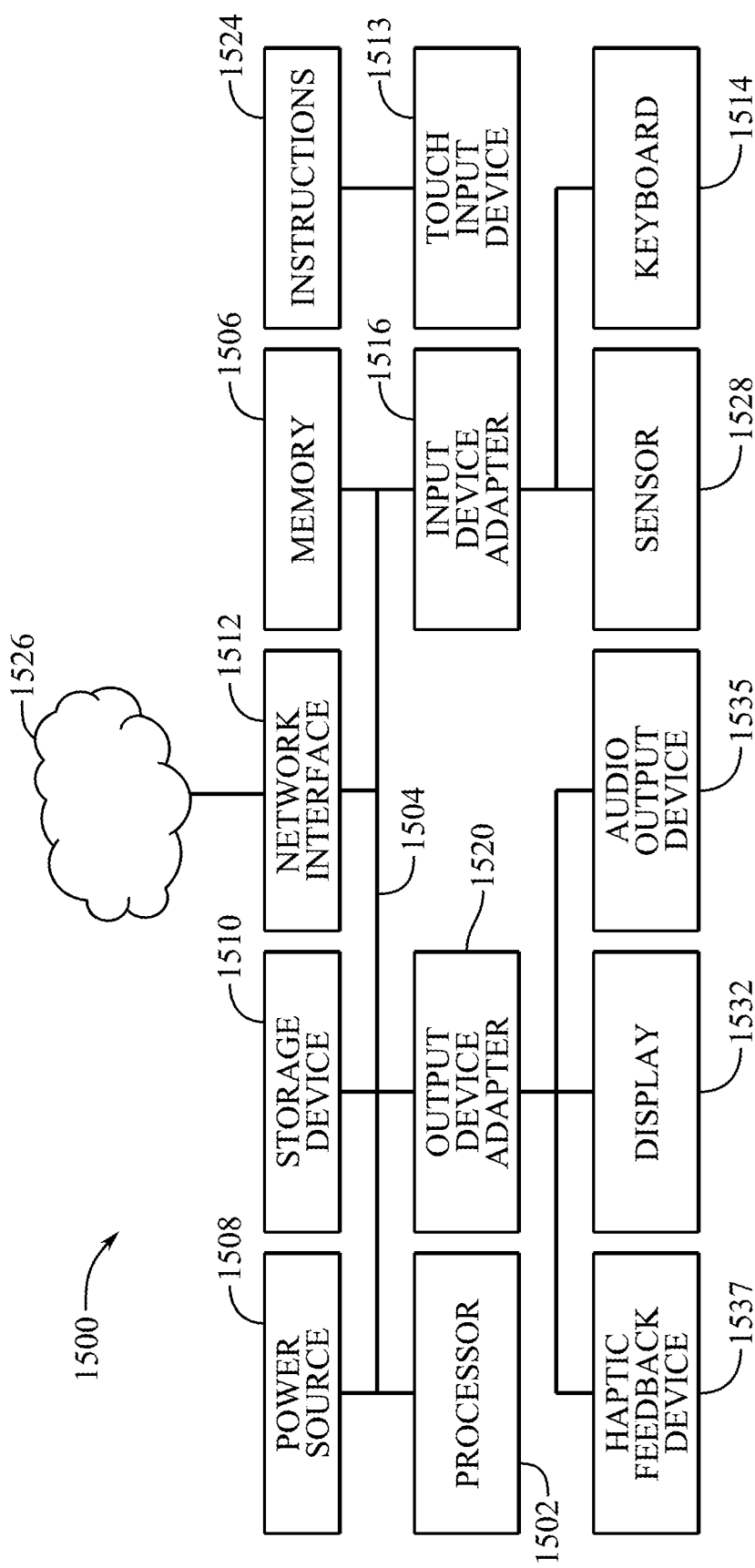
FIG. 15 shows a high-level block diagram of a computer system configured to implement one or more aspects of the present disclosure.

FIG. 15 illustrates a high-level block diagram of a computer system 1500 that can be used to implement embodiments of the present disclosure. In various embodiments, the computer system 1500 can comprise various sets and subsets of the components shown in FIG. 15. Thus, FIG. 15 shows a variety of components that can be included in various combinations and subsets based on the operations and functions performed by the system 1500 in different embodiments. For example, the computer system 1500 can be part of the computing device 102 (or an input device or an electronic case) described above in connection with the foregoing figures. It is noted that, when described or recited herein, the use of the articles such as "a" or "an" is not considered to be limiting to only one, but instead is intended to mean one or more unless otherwise specifically noted herein.

The computer system 1500 can comprise a central processing unit (CPU) or processor 1502 connected via a bus 1504 for electrical communication to a memory device 1506, a power source 1508, an electronic storage device 1510, a network interface 1512, an input device adapter 1516, and an output device adapter 1520. For example, one or more of these components can be connected to each other via a substrate (e.g., a printed circuit board or other substrate) supporting the bus 1504 and other electrical connectors providing electrical communication between the components. The bus 1504 can comprise a communication mechanism for communicating information between parts of the system 1500.

The processor 1502 can be a microprocessor or similar device configured to receive and execute a set of instructions 1524 stored by the memory 1506. The memory 1506 can be referred to as main memory, such as random access memory (RAM) or another dynamic electronic storage device for storing information and instructions to be executed by the processor 1502. The memory 1506 can also be used for storing temporary variables or other intermediate information during execution of instructions executed by the processor 1502. The processor 1502 can include one or more processors or controllers, such as, for example, a CPU for the computing device 102 in general and a touch controller or similar sensor or I/O interface used for controlling and receiving signals from the display and any other sensors being used. The power source 1508 can comprise a power supply capable of providing power to the processor 1502 and other components connected to the bus 1504, such as a connection to an electrical utility grid or a battery system.

The storage device 1510 can comprise read-only memory (ROM) or another type of static storage device coupled to the bus 1504 for storing static or long-term (i.e., non-dynamic) information and instructions for the processor 1502. For example, the storage device 1510 can comprise a magnetic or optical disk (e.g., hard disk drive (HDD)), solid state memory (e.g., a solid state disk (SSD)), or a comparable device.

The instructions 1524 stored by the memory 1506 or storage device 1510 can comprise information for executing processes and methods using components of the system 1500. Such processes and methods can include, for example, the connection processes described herein for connecting an electronic case to a computing device, connecting an accessory device to an electronic case, controlling an input setting, controlling a display setting, controlling the enabled/disabled state of the keyboard 1514 or other input device 1513, determining a hinge angle, etc.

The network interface 1512 can comprise an adapter for connecting the system 1500 to an external device via a wired or wireless connection. For example, the network interface 1512 can provide a connection to a computer network 1526 such as a cellular network, the Internet, a local area network (LAN), a separate device capable of wireless communication with the network interface 1512, other external devices or network locations, and combinations thereof. In one example embodiment, the network interface 1512 is a wireless networking adapter configured to connect via WI-FI®, BLUETOOTH®, BLE, Bluetooth mesh, or a related wireless communications protocol to another device having interface capability using the same protocol. In some embodiments, a network device or set of network devices in the network 1526 can be considered part of the system 1500. In some cases, a network device can be considered connected to, but not a part of, the system 1500.

The input device adapter 1516 can be configured to provide the system 1500 with connectivity to various input devices such as, for example, a keyboard, an accessory device (e.g., the accessory device 108), related devices, and combinations thereof.

The output device adapter 1520 can be configured to provide the system 1500 with the ability to output information to a user, such as by providing visual output using one or more displays 1532 (e.g., a display portion of the computing devices described herein), by providing audible output using one or more speakers 1535, or providing haptic feedback sensed by touch via one or more haptic feedback devices 1537. Other output devices can also be used. The processor 1502 can be configured to control the output device adapter 1520 to provide information to a user via the output devices connected to the adapter 1520.

Any of the features, components, parts, including the arrangements and configurations thereof shown in FIG. 15 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 15.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A modular electronic device system, comprising:
    a computing device including a first sensor, a processor, and a memory device; and
    an input device comprising a frame and a flexible elongated tail positioned on a perimeter edge of the frame, the flexible elongated tail including an attachment portion at an end of the flexible elongated tail, the attachment portion being removably connected to the computing device and configured to suspend the computing device above a support surface, the input device including a second sensor;
    wherein the memory device stores instructions that, when executed by the processor, cause the processor to:
       determine an angle of the computing device relative to a gravitational direction based on a first signal from the first sensor;
       determine an angle of the input device relative to the gravitational direction based on the second signal from the second sensor;
       determine a hinge angle between the computing device and the input device at the flexible elongated tail based on the angle of the computing device and the angle of the input device; and
       change an input setting in response to determining the hinge angle; and
    wherein:
       the processor is configured to set the input setting to a first state based on the hinge angle being within a first range of hinge angles, the first range of hinge angles comprising 30 degrees to 120 degrees; and
       the processor is configured to set the input setting to a second state based on the hinge angle being within a second range of hinge angles different from the first range of hinge angles, the second range of hinge angles comprising angles outside the first range of hinge angles.

2. The modular electronic device system of claim 1, wherein:
  changing the input setting comprises enabling the input device or disabling the input device;
  the processor is configured to enable the input device based on the hinge angle being within the first range of hinge angles; and
  the processor is configured to disable the input device based on the hinge angle being within the second range of hinge angles.

3. The modular electronic device system of claim 1, wherein the processor is configured to change the input setting based on at least three consecutive sensor samples indicating the hinge angle is within the first range of hinge angles or the second range of hinge angles.

4. The modular electronic device system of claim 1, wherein the input device comprises:
  a first Hall effect sensor; and
  a second Hall effect sensor spaced apart from the first Hall effect sensor by a threshold spacing of at least three inches.

5. The modular electronic device system of claim 4, wherein:
  the computing device comprises a first pair of magnets comprising a first polarity configuration and a second pair of magnets comprising a second polarity configuration different from the first polarity configuration; and
  the first Hall effect sensor and the second Hall effect sensor are configured to identify one of the first polarity configuration or the second polarity configuration, depending on a positioning of the input device when abutted against the computing device.

6. The modular electronic device system of claim 5, wherein the processor is configured to change the input setting based on sensor data from the first Hall effect sensor and the second Hall effect sensor in addition to the hinge angle.

7. A keyboard, comprising:
  a keyboard housing;
  a set of key mechanisms disposed in the keyboard housing;
  a trackpad disposed in the keyboard housing and positioned adjacent to the set of key mechanisms;
  a first sensor comprising a first Hall Effect sensor;
  a second sensor comprising a second Hall Effect sensor, the second Hall Effect sensor spaced away from the first Hall Effect sensor by at least a threshold spacing, and the first Hall Effect sensor and the second Hall Effect sensor are each disposed in diagonally opposing corners of the trackpad;
  a processor; and
  a memory device storing instructions that, when executed by the processor, cause the processor to determine an input state for the keyboard based on a sensor signal from the first Hall Effect sensor and the second Hall Effect sensor.

8. The keyboard of claim 7, wherein the threshold spacing comprises at least three inches.

9. The keyboard of claim 7, wherein the first Hall Effect sensor and the second Hall Effect sensor are positioned at opposing corners of the keyboard housing.

10. The keyboard of claim 7, wherein the first Hall Effect sensor and the second Hall Effect sensor are configured to detect a polarity direction of a set of magnets positioned in a computing device.

11. The keyboard of claim 10, wherein the first Hall Effect sensor and the second Hall Effect sensor are configured to detect individual polarities of discrete magnets in the set of magnets.

12. The keyboard of claim 7, further comprising a printed circuit board, wherein the first Hall Effect sensor, the second Hall Effect sensor, and one or more other sensors associated with the trackpad are in electrical communication with the printed circuit board.

13. A computing device, comprising:
  a housing;
  a display portion formed within the housing, the display portion configured to present an on-screen keyboard for user input in a first input state;
  at least one sensor configured to generate gravity data comprising at least a roll angle and a pitch angle of the computing device, wherein the at least one sensor is configured to generate sensor signals at a sampling rate between about 10 Hertz and about 15 Hertz;
  a processor; and
  a memory device storing instructions that, when executed by the processor, cause the processor to transmit a signal to at least one of the display portion or a keyboard based on the gravity data,
  wherein the signal comprises computer-executable instructions to change between the first input state and a second input state, the second input state configured for user input at the keyboard.

14. The computing device of claim 13, wherein the at least one sensor comprises an inertial measurement unit.

15. The computing device of claim 13, wherein the processor is configured to receive, from the keyboard, additional gravity data comprising at least a keyboard roll angle and a keyboard pitch angle.

16. The computing device of claim 15, wherein the processor is configured to transmit the signal to at least one of the display portion or the keyboard based on the additional gravity data and the gravity data.

* * * * *